United States Patent
Anguelov et al.

(10) Patent No.: US 8,510,041 B1
(45) Date of Patent: Aug. 13, 2013

(54) AUTOMATIC CORRECTION OF TRAJECTORY DATA

(75) Inventors: Dragomir Anguelov, Mountain View, CA (US); Scott Lininger, Lafayette, CO (US); Ehud Rivlin, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 173 days.

(21) Appl. No.: 13/227,283

(22) Filed: Sep. 7, 2011

Related U.S. Application Data

(60) Provisional application No. 61/481,423, filed on May 2, 2011.

(51) Int. Cl.
*G01C 21/32* (2006.01)

(52) U.S. Cl.
USPC .......................................................... 701/445

(58) Field of Classification Search
USPC ................ 701/445, 479, 480, 500, 501, 505, 701/509, 518, 520, 534, 540, 205, 210, 214, 701/468, 469, 473
See application file for complete search history.

(56) References Cited

U.S. PATENT DOCUMENTS

| | | | | |
|---|---|---|---|---|
| 5,233,526 A | * | 8/1993 | Detriche et al. | 701/26 |
| 6,467,721 B1 | * | 10/2002 | Kautzsch et al. | 244/3.11 |
| 6,666,401 B1 | * | 12/2003 | Mardirossian | 244/3.11 |
| 6,865,441 B2 | * | 3/2005 | Chandhoke | 700/189 |
| 7,439,907 B2 | * | 10/2008 | Wang et al. | 342/357.23 |
| 2010/0032514 A1 | * | 2/2010 | Mentink | 244/3.13 |

* cited by examiner

*Primary Examiner* — James Trammell
*Assistant Examiner* — Rodney Butler
(74) *Attorney, Agent, or Firm* — Marshall, Gerstein & Borun LLP

(57) ABSTRACT

Pose data includes multiple pose samples, where each pose sample indicates a reported location of a device at a respective time, and where the multiple pose samples describe a trajectory of the device. To correct the pose data, pose modification data for some of the pose samples is received, indicating respective modifications of the pose samples by a user. Several other pose samples are automatically modified in view of the received pose modification data. To automatically modify the pose samples, one or more user modification constraints are applied, where each user modification constraint seeks to preserve the modification of the location of the device for a respective pose sample. One or more location constraints are also applied, each of which seeks to preserve the reported location of the device for a respective pose sample. Modified pose data is generated in view of the user modification constraints and the location constraints.

32 Claims, 15 Drawing Sheets

AUTOMATIC CORRECTION OF TRAJECTORY DATA

CROSS-REFERENCE TO A RELATED APPLICATION

This application claims the benefit of U.S. Provisional Patent Application No. 61/481,423, entitled "Automatic Correction of Vehicle Trajectory Data" and filed on May 2, 2011, the entire disclosure of which is hereby incorporated by reference herein.

FIELD OF THE DISCLOSURE

This disclosure relates to automatically correcting data that describes a trajectory of a device in view of one or more user modifications of the data.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Today, positioning devices, such as Global Positioning Service (GPS) receivers, are widely used to determine a geographic location of a person or an object. For example, a camera equipped with a GPS receiver determines the position of the camera in the GPS coordinate system at the time a photograph is taken and stores the determined GPS coordinates with the photograph as positioning data, which later can be used to determine what is depicted in the photograph (e.g., which building in what city), for example. Further, a GPS receiver may be installed in a vehicle for use in navigation or tracking the vehicle.

However, in some situations, positioning data fails to indicate the geographic location with the desired precision. For example, GPS generally has a margin of error of approximately 15 meters. In so-called "urban canyons," or city locations at which tall buildings obscure or reflect GPS signals, the problem of imprecise coordinates is particularly prevalent.

SUMMARY

In an embodiment, a method for correcting pose data stored on a computer-readable medium is implemented in one or more computers. The pose data includes multiple pose samples, where each pose sample indicates at least a reported location of a device at a respective time, and where the multiple pose samples describe a trajectory of the device. The method includes receiving pose modification data for a first set of one or more of the pose samples, such that the received pose modification data indicates a respective modification by a user of each pose sample included in the first set, and automatically modifying a second set of one or more of the pose samples in view of the received pose modification data, where the second set includes at least one pose sample not included in the first set. Automatically modifying the second set includes applying one or more user modification constraints, where each of the one or more user modification constraints seeks to preserve the modification of the location of the device for a respective pose sample in the first set of pose samples, applying one or more location constraints, where each of the one or more location constraints seeks to preserve the reported location of the device for a respective pose sample in the second set, and generating modified pose data in view of the one or more user modification constraints and the one or more location constraints.

In another embodiment, a pose correction engine for modifying a trajectory of a device includes an interface module, a user modification term generator, a location term generator, and a pose optimizer module communicatively coupled to the user modification term generator and to the location term generator. The interface module is configured to receive pose data that includes multiple pose samples, where each pose sample indicates at least a reported location of a device at a respective time, and where the multiple pose samples describe the trajectory of the device, and pose modification data for a first set of one or more of the pose samples, where the received pose modification data indicates a respective modification by a user of each pose sample included in the first set of pose samples. The user modification term generator is configured to generate a respective user modification term for each pose sample in the first set of pose samples, where each user modification term represents a respective user modification constraint that seeks to preserve the modification by the user for the corresponding pose sample. The location term generator is configured to generate a respective location term for each pose sample in a second set of one or more of the plurality of pose samples, where the second set of pose samples includes one or more pose samples not included in the first set of pose samples, and where each location term represents a respective location constraint that seeks to preserve the reported location of the device for the corresponding pose sample. The pose optimizer module is configured to modify each pose sample in the second set using the one or more user modification terms and the one or more location terms to generate modified pose data, whereby the modified pose data optimally agrees with the pose modification data and the received pose data in view of the one or more user modification constraints and the one or more location constraints.

In yet another embodiment, a trajectory correction system includes a database configured to store pose data that includes multiple pose samples, where each pose sample indicates at least a reported location of a device at a respective time, and where the pose samples describe a trajectory of the device in a three-dimensional space. The trajectory correction system also includes a pose rendering engine communicatively coupled to the database and configured to provide an interactive user interface via which a user can modify one or more pose samples, and receive pose modification data from the interactive user interface for a first set of one or more of the pose samples, where the received pose modification data indicates a respective modification of each pose sample included in the first set. The trajectory correction system further includes a pose correction engine communicatively coupled to the database and to the pose rendering engine, where the pose correction engine is configured to receive the pose modification data to automatically modify each pose sample in a second set of one or more of the pose samples in view of the received pose modification data so to generate modified pose data, where the second set includes at least one pose sample not included in the first set.

DETAILED DESCRIPTION

Figure 1:
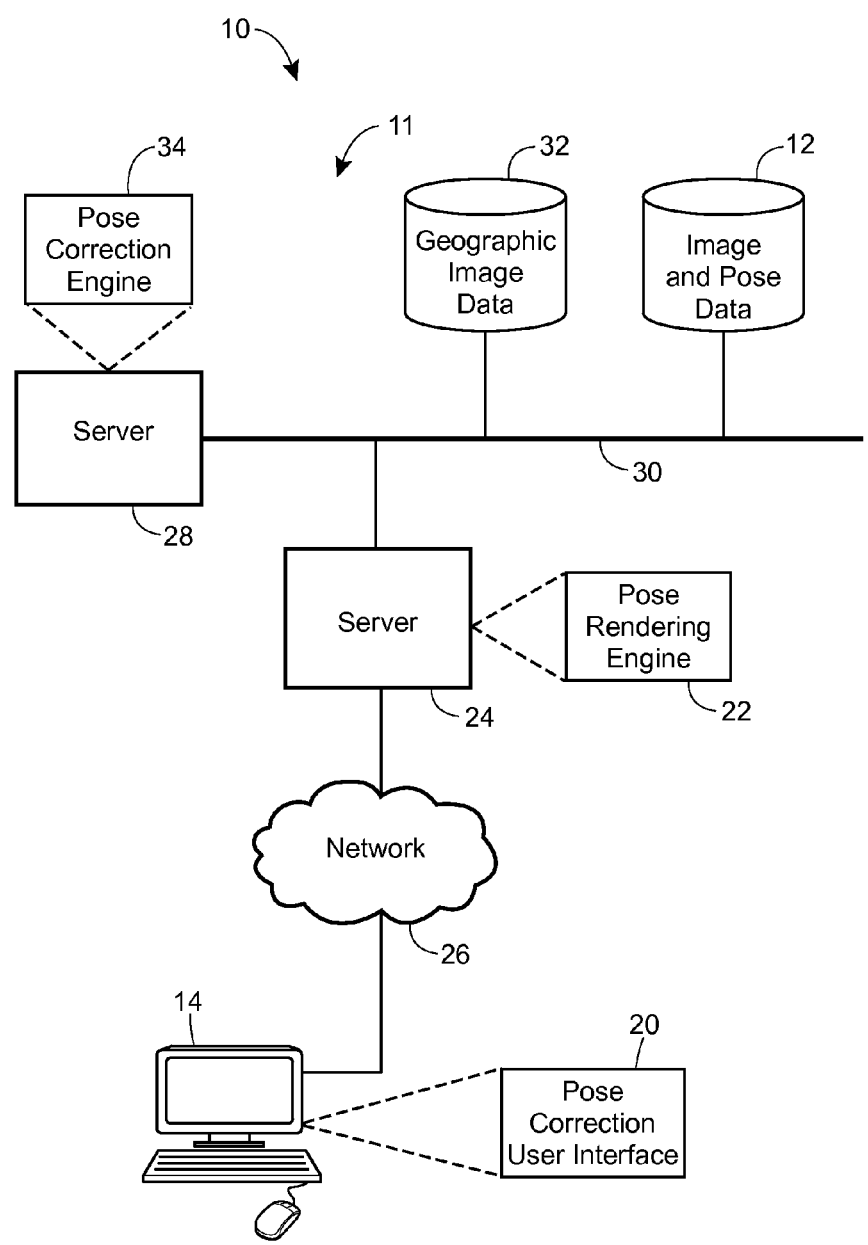
FIG. 1 is a block diagram of an example image positioning system in which a vehicle trajectory correction system operates to automatically modify pose data for a vehicle, according to an embodiment.

According to the techniques of the present disclosure, a trajectory of a moving device or object, such as a vehicle travelling along a certain path in three-dimensional space, is automatically modified in view of one or several modifications of the trajectory by an operator (or "user") so as to correct large absolute errors while preserving local trajectory shape, when possible. In an embodiment, the trajectory of the vehicle is described by positioning data including multiple samples, each of which indicates the position and the orientation of the vehicle at a respective time (collectively referred to herein as a "pose"). For example, as a car equipped with a Global Positioning Service (GPS) receiver, an Inertial Measurement Unit (IMU), and a wheel odometer travels through a city during an hour-long drive, pose samples including the reported location and orientation of the vehicle in three dimensions typically are obtained once every ten milliseconds using the GPS receiver and the IMU to define a set of 100*60*60=360,000 pose samples. In general, however, the pose samples can be collected at any suitable rate such as 400 Hz or 800 Hz, for example. A set of pose samples corresponding to a trajectory of a certain vehicle may be referred to herein as a "pose run." After a user modifies one or more pose samples in the pose run, the user modifications are interpolated and/or extrapolated so that one or more other pose samples are modified in view of the user modifications to generate a corrected trajectory in view of certain constraints. Moreover, in some cases, some or all of the pose samples modified by the user are further modified in view of the constraints as well as the original user modifications. For efficiency, user modifications and automatic correction of pose samples are performed on sub-sampled positioning data, according to some embodiments. Further, in some of these embodiments, vehicle trajectory corrections performed on a sub-sampled version of the positioning data are then automatically extended to the entire set of pose samples.

As discussed in more detail below, the constraints that affect trajectory corrections may be expressed as terms in an optimization framework, where the various terms define constraint violation penalties with different strengths, and where the optimization goal is to minimize the total sum of term penalties. A set of pose samples is then solved for so as to optimally satisfy the constraints using an optimization scheme such as a local search method (e.g., gradient descent, conjugate gradient method, the Levenberg-Marquardt method) while applying the optimization terms. For example, in an embodiment, user modifications to one or more pose samples are expressed as a relatively strong optimization term, and the reported locations included in the pose samples are expressed as a relatively weak optimization term. Additional terms, such as relative translation and relative rotation terms, may be used to accurately and efficiently correct pose run data.

In an embodiment, the trajectory correction techniques of the present disclosure are used to modify pose data corresponding to a series of images collected along a certain path. For example, FIG. 1 illustrates an image positioning system 10 in which an operator adjusts camera pose data for selected images using an interactive visualization that includes satellite imagery, a street map, a topographic map, or another type of a representation of a geographic area. The image positioning system 10 includes a vehicle trajectory correction system 11 that automatically modifies the pose data in view of one or more user adjustments.

For clarity, operation of an image positioning system is discussed first with reference to FIGS. 1-13, and example techniques which a vehicle trajectory correction system 11 may implement are then discussed with reference to FIGS. 14-18.

Image Positioning System

Generally speaking, the image positioning system 10 provides an interactive visualization that includes one or more pose indicators, such as pictograms, representing poses in the corresponding locations in the geographic area. The interactive visualization is displayed via a user interface that includes a display device and an input device, for example. The operator uses the pose indicators to select one or more poses that appear to be in wrong locations and, when appropriate, moves the selected poses to the locations in the geographic area where the operator believes the corresponding images likely were obtained. For example, the operator may see that a pose indicator representing a pose that is associated with a certain position of a vehicle is rendered over an image of a building, and conclude that the pose is likely incorrect. The operator may then adjust the position of the pose indicator in the interactive visualization so as to place the corresponding pose into a nearby location in a street. In some cases, the operator may also inspect one or more images associated with a certain pose to more accurately determine whether and how the pose should be adjusted. In response to the user adjusting the location of a pose indicator in the interactive visualization, or accepting as valid the currently displayed location of the pose indicator, user modifications data for the corresponding pose may be generated. For example, if the pose includes GPS coordinates, new GPS coordinates corresponding to the updated location to which the operator has moved the pose indicator may be automatically calculated and stored along with the originally reported GPS coordinates for generating a user modification constraint.

According to an example scenario, a camera mounted on a vehicle traveling along a certain path periodically photographs the surrounding area and obtains pose data, such as GPS coordinates, for each photograph. A series of camera poses collected along the path, or a pose run, corresponds to the trajectory of the vehicle. The photographs and the corresponding poses are then uploaded to an image and pose database 12. The images and poses stored in the pose database 12 may be used to provide on demand street-level views of geographic regions, for example, or in other applications. However, because GPS coordinates are not always accurate, one or more operators may use the image positioning system 10 to verify and, when needed, adjust poses of some of the images stored in the database 12.

To select and adjust one or more poses in a pose run, the operator may use a computing device 14 that implements a pose correction user interface (UI) component 20. In general, the pose correction UI component 20 displays a visualization of a geographic area and a representation of a pose run superimposed on the visualization of the geographic area on a display device. To represent a pose run, the pose correction UI component 20 may display pose indicators (e.g., graphic symbols such as circles, alphanumeric symbols, images, etc.) at the locations on the map corresponding to the poses and, in an embodiment, also display lines or arrows interconnecting consecutive pose indicators to illustrate the path the camera has travelled. The pose correction UI component 20 allows the operator to select and reposition the pose by dragging the corresponding pose indicator over to the desired location on the map, for example. In response to the user repositioning one or several pose indicators, the pose correction UI component 20, or another software component executing in the computing device 20, forwards the updated pose information to a pose rendering engine 22 for further processing.

In an embodiment, the pose rendering engine 22 operates in a front-end server 24 to which the pose rendering engine 22 is communicatively coupled via a network 26. The front-end server 24 in turn may be communicatively coupled to the image and pose database 12, one or several back-end servers 28 in which corresponding instances of a pose correction engine 34 operate, and a geographic image database 32 via a communication link 30. In this embodiment, the computing device 14 operates as a client device that receives geographic area data, pose data, etc. from the front-end server 24 and the back-end server 28. During operation, the pose rendering engine 22 may report pose corrections received from the pose correction UI component 20 to the pose correction engine 34, receive updated pose run data from the pose correction engine 34, and provide an updated visualization of the geographic area and the pose run to the pose correction UI component 20. The pose correction engine 34 may process the pose corrections received from the pose rendering engine 22 and, when appropriate, update the image and pose database 12. For example, the pose correction engine 34 may determine whether a pose correction submitted by an operator is within an allowable range and whether the pose correction conflicts with another pose correction, submitted by another operator at the same time or previously.

Further, in some embodiments, the pose correction engine 34 along with pose rendering engine 22 and the image and pose database 12 operate in the vehicle trajectory correction system 11 that automatically adjusts one or more poses in a pose run (e.g., poses 2, 3, 4, and 5) based on the received corrections to one or more other poses in the same pose run (e.g., poses 1 and 6). Still further, the pose correction engine 34 may analyze pose data adjusted or accepted by an operator to detect pose trends, such as a consistent "drift" in the originally stored GPS coordinates, for example. In an embodiment, the pose correction engine 34 utilizes the detected trends in automatic correction of pose data. For example, the pose correction engine 34 may then downweight optimization terms corresponding to the reported locations.

In an embodiment, the pose correction UI component 20 prompts the operator for authentication information (e.g., login and password) prior to granting the operator access to pose data stored in the image and pose database 12.

In general, the functionality of the pose correction UI component 20, the pose rendering engine 22, and the pose correction engine 34 can be distributed among various devices operating in the image positioning system 10 in any suitable manner. For example, if desired, both the pose rendering engine 22 and the pose correction engine 34 can be implemented in a single device such as the front-end server 24. As another example, the pose correction UI component 20, the pose rendering engine 22, and the pose correction engine 34 can be implemented in a single computing device such as a PC. As yet another example, the rendering of a geographic area and a pose run mapped onto the geographic area can be implemented in the computing device 14. In one such embodiment, a browser plug-in is installed in the computing device 14 to support the necessary rendering functionality. In another embodiment, the pose correction UI component 20 is provided in a separate application executing on the computing device 14.

Depending on the implementation, the network 26 may be the Internet, an intranet, or any other suitable type of a network. The communication link 30 may be an Ethernet link or another type of a wired or wireless communication link. Further, as discussed in more detail below, the computing device 14 may be a desktop personal computer (PC), a laptop PC, a tablet PC, a mobile device such as a smartphone, etc.

Next, an example data structure that may be used to store and process image and pose data for use in the image positioning system 10 is described with reference to FIG. 2, followed by a discussion of the user interface supported by the image positioning system 10, as well as various features of the image positioning system 10 accessible via the pose correction UI 22, with reference to FIGS. 3-7. In particular, FIGS. 3-7 illustrate several example interactive screens that may be displayed on a display device and using which an operator may verify and adjust image pose data.

Figure 2:
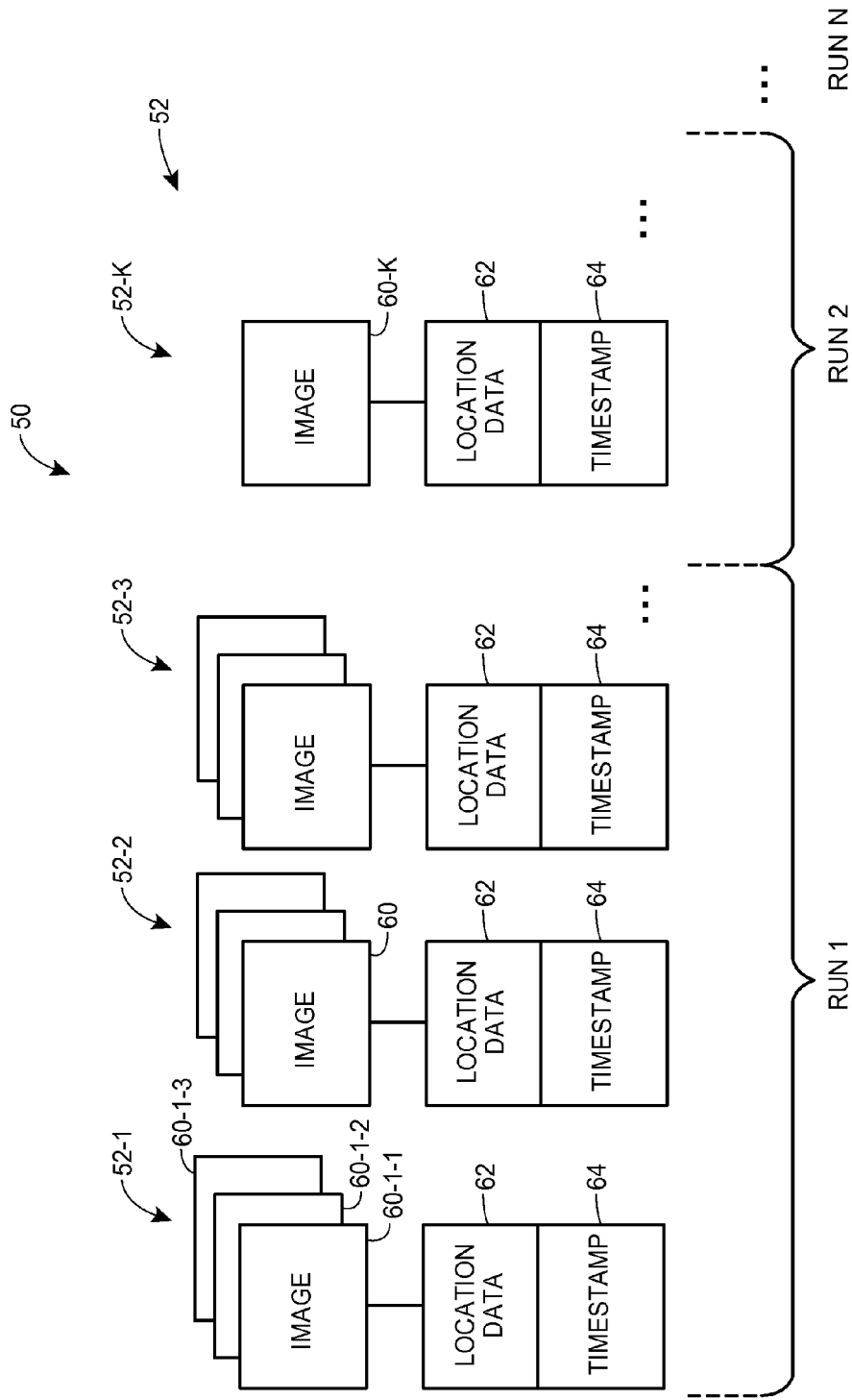
FIG. 2 is a block diagram of an example data structure that may be used in the image positioning system of FIG. 1 to store images and the associated metadata.

First referring to FIG. 2, a data structure 50 may include several pose records 52, (i.e., pose records 52-1, 52-2, . . . 52-K). The image and pose database 12 illustrated in FIG. 1, for example, may store the pose records 52 on a computer-readable medium. The pose records 52 may correspond to one or more pose runs 1, 2, . . . N, which may include the same number of pose records or different numbers of pose records, depending on the implementation. Each pose record 52 may include one or more images 60 and pose data such as location/positioning data 62 and a timestamp 64. For example, the pose records 52-1 includes images 60-1-1, 60-1-2, and 60-1-3, which may be photographs taken at the same time from the same point in space using cameras pointing in different directions. The pose records 52-2 and 52-3, generated during or following the same pose run, include similar sets of images. On the other hand, the pose record 52-K includes a single image 60-K, which may be a panoramic photograph, for example.

In an embodiment, the location data 62 includes GPS coordinates. In another embodiment, the location data 62 includes local positioning service (LPS) data such as an identifier of a proximate WiFi hotspot, for example. In general, the location data 62 can include any suitable indication of a location with which the one or several images 60 are associated.

The timestamp 64 stores time data in any suitable manner. For example, the timestamp 64 may indicate the year, the month, and the day the corresponding images were obtained. In some implementations, the timestamp 64 may additionally indicate the hour and the minute, for example. The timestamp 64 in other implementations may indicate a time relative to a certain event, e.g., the time the first photograph in the corresponding pose run is taken, or the timestamp 64 may be implemented as any other suitable type of a time metric.

Further, in some embodiments, images and poses may be sequentially labeled to simplify a reconstruction of the order in which the images were collected during a pose run. For example, a certain pose record 52 may include a sequence number (not shown) to indicate the order of each pose record 52 within a certain run i relative to other pose records 52 within the same run i. Still further, the pose records 52 may include pose run identifiers (not shown) to differentiate between the pose runs 1, 2, . . . N. Accordingly, in this embodiment, images collected during the same pose run may be assigned the same pose run identifier.

Still further, in an embodiment, the data structure 50 includes flags (not shown) indicating whether pose data has been verified and/or adjusted by one or more operators. For example, a binary flag may be set to a first value (e.g., logical "true") if the corresponding pose data has been verified, and to a second value (e.g., logical "false") if the corresponding pose data has not yet been verified. Depending on the implementation, each of the pose records 52 may include a record-specific flag, or flags may be set on a per-pose-run basis. In another embodiment, flags are implemented in a configuration database that is physically and/or logically separate from the image and pose database 12.

Figure 3:
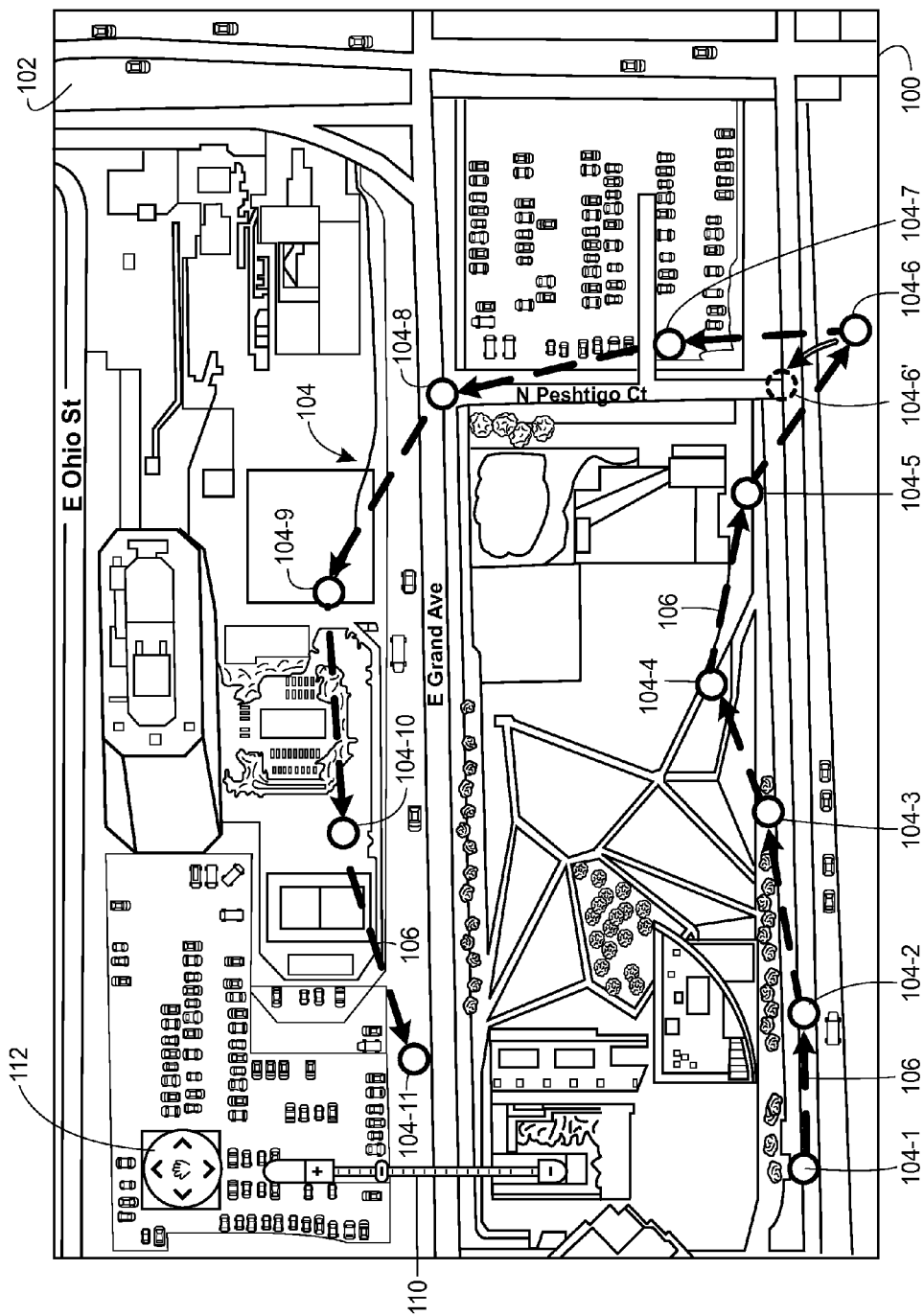
FIG. 3 is an example screenshot of a user interface via which an operator may adjust location data for images using the techniques of the present disclosure.
Figure 4:
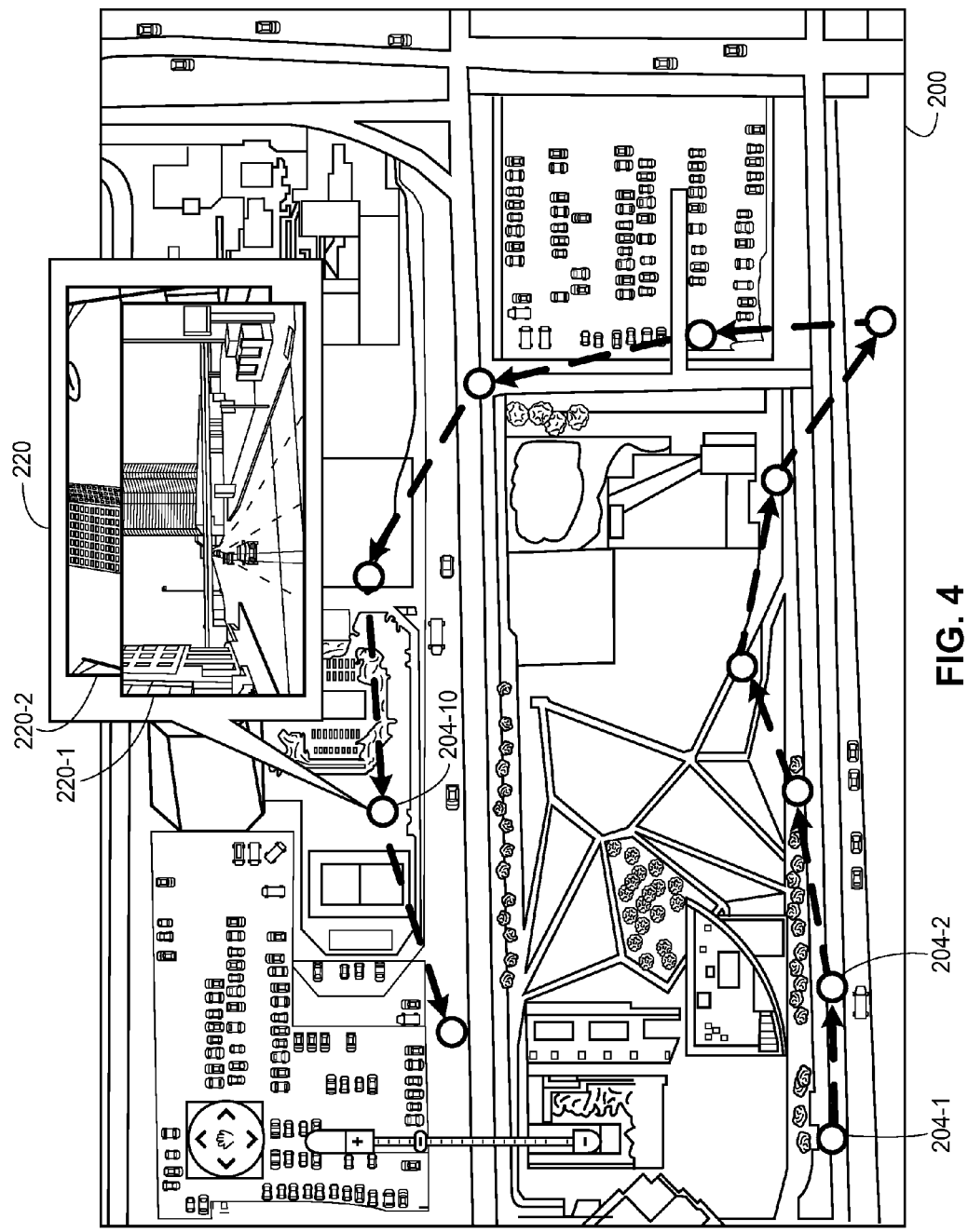
FIG. 4 is an example screenshot of a user interface via which an operator may view images and adjust location data for these images using the techniques of the present disclosure.

Now referring to FIG. 3, the pose correction UI component 20 may generate an interactive screen 100 to allow an operator to adjust image positioning data. Depending on the implementation, the interactive screen 100 may be displayed in a browser application, in a standalone application, or another type of an application. Further, depending on the configuration or the computing environment in which the software displaying the interactive screen 100 executes, the operator may interact with the interactive screen 100 using a mouse, a touchpad, a keyboard, a touch screen, a voice input device, or another suitable type of an input device.

In the example illustrated in FIG. 3, the interactive screen 100 includes a satellite image 102 of several city blocks, displayed in the background, and a series of pose indicators 104 (i.e., 104-1, 104-2, . . . 104-L) displayed in the foreground. In this example, the number of pose indicators L is eleven. In general, however, any number of pose indicators 104 can be simultaneously displayed in the interactive screen 100 or a similar interactive screen. The pose indicators 104-1, 104-2, . . . 104-L are displayed according to the corresponding pose data, e.g., the GPS coordinates stored in the pose data. For example, referring back to FIG. 2, each of the pose indicators 104-1, 104-2, . . . 104-L may be superimposed on the satellite image 102 according to the information in the location data field 62 in the corresponding pose data record 52. Arrows 106 interconnect the pose indicator 104-1, 104-2, . . . 104-L to indicate the order in which the corresponding images were collected. The interactive screen 100 may also include a zoom scrollbar 110 and a navigation control 112 to allow the operator to zoom in and out of certain portions of the displayed satellite image 102 and adjust the center of the satellite image 102, respectively. Depending on the implementation, the interactive screen 100 also may include other controls, such as a compass control to select the orientation of the satellite image 102, for example.

In another embodiment, arrows similar to the arrows 106 are used to indicate the orientation of the vehicle at the time when the corresponding image was collected. In yet another embodiment, arrows that indicate the order of the images as well as arrows that indicate the orientation of the vehicle can be displayed in an interactive screen using different styles or colors, for example.

During operation, the operator may select a certain pose run R via an interactive screen (not shown) provided by the pose correction UI component 20, for example. The selection of the pose run R may be based on the date and time when the pose run R took place, the identity of a vehicle used to conduct the pose run R, the identity of the driver of the vehicle, a description of the geographic region in which the pose run R took place, etc. In response to the operator selecting the pose run R, the pose rendering engine 22 (see FIG. 1) or another component may retrieve the pose records 52 that describe poses in the selected pose run R from the image and pose database 12, use the location data 62 in the retrieved pose records 52 to determine a geographic area with which the pose records 52 are generally associated, retrieve the satellite image 102 or another representation of the geographic area, determine where each pose indicator 104-1, 104-2, . . . 104-L should be displayed relative to the background satellite image 102, and display each pose indicator 104-1, 104-2, . . . 104-L in the corresponding location. Depending on the embodiment, pose pictographs 104-1, 104-2, . . . 104-L are displayed for every pose in the pose run R or only for a subset of the poses in the pose run R. For example, to reduce clutter on the interactive screen 100, a respective pose pictograph may be displayed only for every n-th (e.g., fifth, tenth) pose in the pose run R. In general, a pose indicator may be an alphanumeric symbol, a non-textual symbol such as a circle or a triangle, a representative icon, a miniaturization of the photograph corresponding to the pose, or any other type of an indicator. In the example of FIG. 3, each pose indicator 104-1, 104-2, . . . 104-L is a circle.

If pose data includes GPS coordinates, the pose rendering engine 22 may utilize both the surface positioning data, e.g., the latitude and the longitude, and the altitude data. The pose correction UI component 20 accordingly may allow the operator to adjust the position of a pose indicator in three dimensions. Alternatively, the pose rendering engine 22 may utilize only the surface positioning data.

In some embodiments, the pose rendering engine 22 automatically determines the size and/or the zoom level of the satellite image 102 based on the retrieved pose records 52. To this end, in one embodiment, the pose rendering engine 22 identifies which of the poses in the pose run R are at the boundaries of an area that encompasses the entire pose run R. For example, if the satellite image 102 of FIG. 3 is displayed with the common north-at-the-top orientation, the pose corresponding to the pose indicator 104-1 is at the western boundary of the pose run R, the pose corresponding to the pose indicator 104-6 defines the southern and the eastern boundaries of the pose run, and the pose corresponding to the pose indicator 104-9 corresponds to the northern boundary of the pose run. Upon identifying the area that encompasses the entire pose run, the pose rendering engine 22 may select a geographic area that includes at least the identified area (e.g., the identified area and a certain offset in each of the four cardinal directions). In another embodiment, the pose rendering engine 22 determines which of the poses in the pose run R is in the most central position relative to the rest of the pose run R, and centers the satellite image 102 around the most central pose. In yet another embodiment, the pose rendering engine 22 determines the centroid of the poses in the pose run R and centers the satellite image 102 around the determined centroid. Further, in yet another embodiment, the pose correction UI component 20 and/or the pose rendering engine 22 allows the user to select the satellite image 102 prior to selecting the pose run R.

Using a mouse, for example, the operator may point to the pose indicator 104-6, left-click on the pose indicator 104-6, drag the pose indicator 104-6 to a new location, and release the left mouse button. Because the pose indicator 104-6 appears to be on a sidewalk, the operator may move the pose indicator 104-6 to a new location in the street to define a pose indicator 104-6', as schematically illustrated in FIG. 3 using dashed lines. Thus, in this scenario, the operator primarily relies on visual cues to determine where the pose indicator 104-6 should be moved. Moreover, in a scenario that involves collecting images and pose information using a car, the operator typically can assume that a pose indicator displayed in a pedestrian area is incorrect and accordingly requires adjustment.

The pose correction UI component 20 may automatically adjust the length and/or the orientation of the arrows 106 that interconnect the pose indicator 104-6' with the neighbor pose indicators 104-5 and 104-7. Further, the pose correction UI component 20 may forward the position of the pose indicator 104-6' in the interactive screen 100 to the rendering engine 22. In response, the rendering engine 22 and/or the pose correction engine 34 may determine a physical location (e.g., in terms of GPS coordinates) to which the pose indicator 104-6' corresponds or, alternatively, determine the amount and the direction of displacement of the pose indicator 104-6' relative to the pose indicator 104-6. Information indicative of the displacement and/or the physical location to which the pose indicator 104-6' corresponds may be stored along with the originally reported GPS coordinates associated with the pose indicator 104-6. However, in some embodiments, the pose correction UI component 20 forwards the new positions of pose indicators to the rendering engine 22 only after a certain number of pose indicators (e.g., three, four, five) have been moved. In another embodiment, the pose correction UI component 20 forwards adjusted or accepted pose data to the rendering engine 22 after the operator activates a certain control provided on the interactive screen 100, such as an "accept" or "submit" button (not shown), for example. Further, in some embodiments, the automatic adjustment of the arrows 106 may be implemented in the pose rendering engine 22 or the pose correction engine 34 rather than, or in addition to, in the pose correction UI component 20.

In a certain embodiment, the pose correction UI component 20 imposes a limit on how far the operator may move a selected pose indicator or otherwise restricts the ability of the operator to correct pose data. For example, if the operator attempts to move the pose indicator 104-6 beyond a certain distance from the original position of the pose indicator 104-6, the pose correction UI component 20 may display a pop-up window (not shown) or another type of a notification advising the operator that the operation is not permitted. Depending on the implementation, the operator may or may not be allowed to override the notification. As another example, the operator may attempt to adjust the position of a pose indicator in the interactive screen 100 so as to modify the order in which the poses appear in the corresponding pose run. Thus, if a modified position of a pose indicator indicates that the corresponding pose now results in different order in the succession of poses, and thus suggests that the vehicle at some point moved in the opposite direction during the pose run, the pose correction UI component 20 may prevent the modification or at least flag the modification as being potentially erroneous.

Further, in some embodiments, the pose correction UI component 20 permits operators to mark certain poses for deletion. An operator may decide that certain pose runs should be partially or fully deleted if, for example, images associated with the poses are of a poor quality, or if the operator cannot determine how pose data should be adjusted. Conversely, an operator may decide that none of the poses in a pose run require correction and accept the currently displayed pose run without any modifications.

In some situations, an operator may wish to view the image (or, when available, multiple images) corresponding to a certain pose indicator prior to moving the pose indicator. For example, referring to an interactive screen 200 illustrated in FIG. 4, the operator may decide that a pose indicator 204-10 probably should be moved, but the operator may not be certain how far the pose indicator 204-10 should be moved. In other situations, an operator may not be certain regarding the direction in which a pose indicator should be moved, or the operator may not be entirely convinced that a certain pose indicator should be moved at all. To provide better guidance to the operator, the pose correction UI component 20 may display a set of images 220 in response to the operator right-clicking on the pose indicator 204-10, for example. In other embodiments, the pose correction UI component 20 may provide other controls (e.g., interactive icons, commands in a toolbar, etc.) to allow the operator to view images associated with pose indicators.

As discussed above with reference to FIG. 2, a pose may be associated with a single image, such as a panoramic photograph, or several images collected at the same location, typically but not necessarily at the same time. The set of images 220 in the example of FIG. 4 includes images 220-1 and 220-2, each of which corresponds to a different orientation of a camera mounted on a vehicle during the pose run represented by the pose indicators 204-1, 204-2, etc. The user may scroll through the set 220 and view several photographs to better estimate a new location of the pose indicator 204-10. However, in some situations, the set 220 includes a single photograph.

Figure 5:
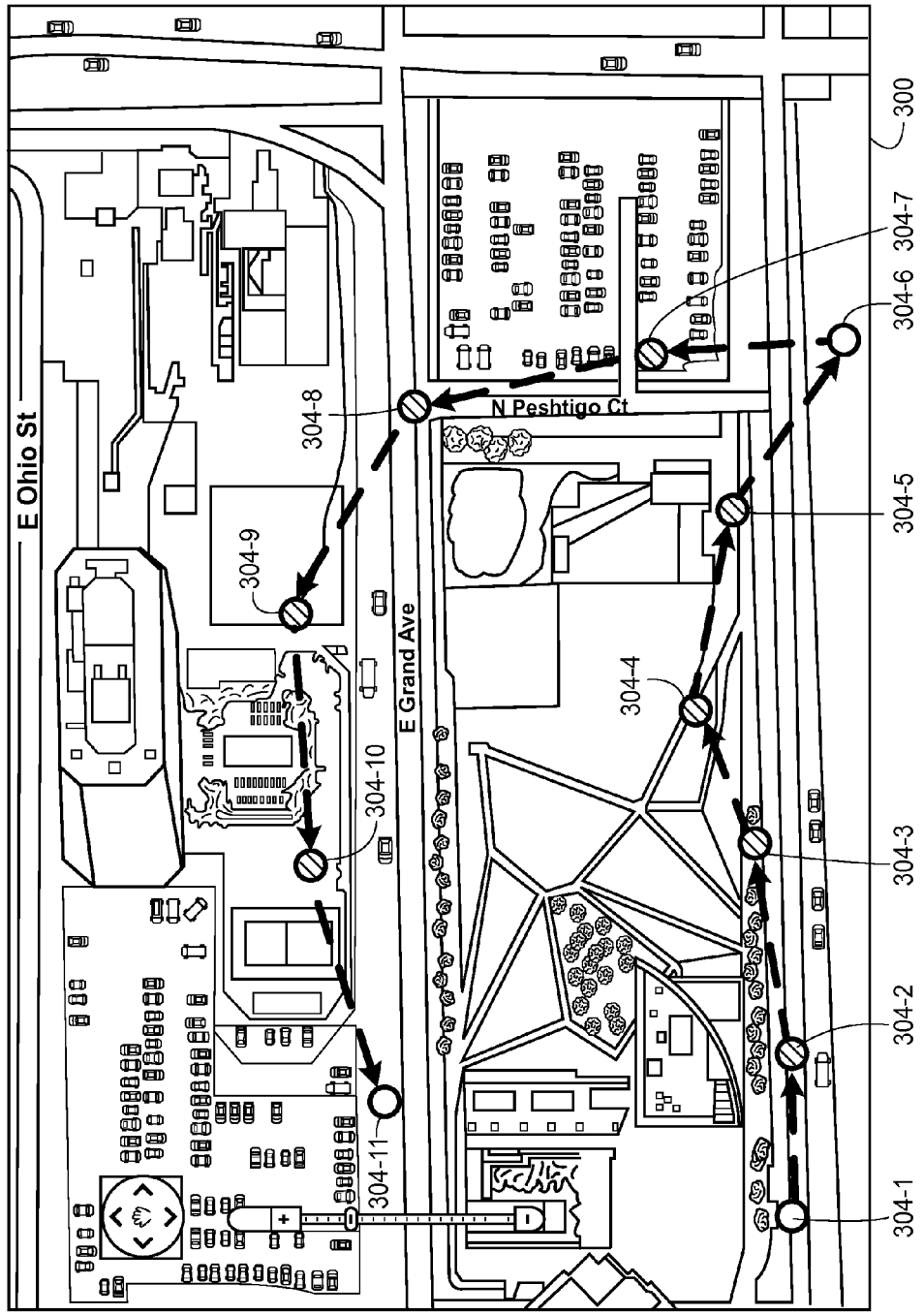
FIG. 5 is another example screenshot of a user interface via which an operator may adjust location data for images using the techniques of the present disclosure.

Now referring to FIG. 5, it may be desirable that the operator review a pose run relatively quickly, particularly if the operator is responsible for a large number of pose runs, each including numerous poses. Further, it may be desirable to prevent the operator from overcorrecting the pose run to the point where the local trajectory shape is destroyed. To expedite pose correction, the pose correction UI component 20 may allow the operator to adjust only non-consecutive poses, or poses separated by no less than N intermediate poses. For example, in an interactive screen 300, pose indicators 304-1, 304-6, and 304-11 are adjustable, but the pose indicators 304-2 through 304-5, as well as the pose indicators 304-7 through 304-11, are not adjustable. Poses that are not adjustable and poses that are adjustable may be represented by different symbols, e.g., circles of two different colors. In an embodiment, the pose correction UI component 20 and/or the pose rendering engine 22 determine whether a particular pose is adjustable based on the proximity of the pose to a pose that is adjustable, so that an operator can adjust only every eighth pose, for example. In various implementation, other factors, such as the minimum spatial separation between two consecutive adjustable poses can be used.

Figure 6:
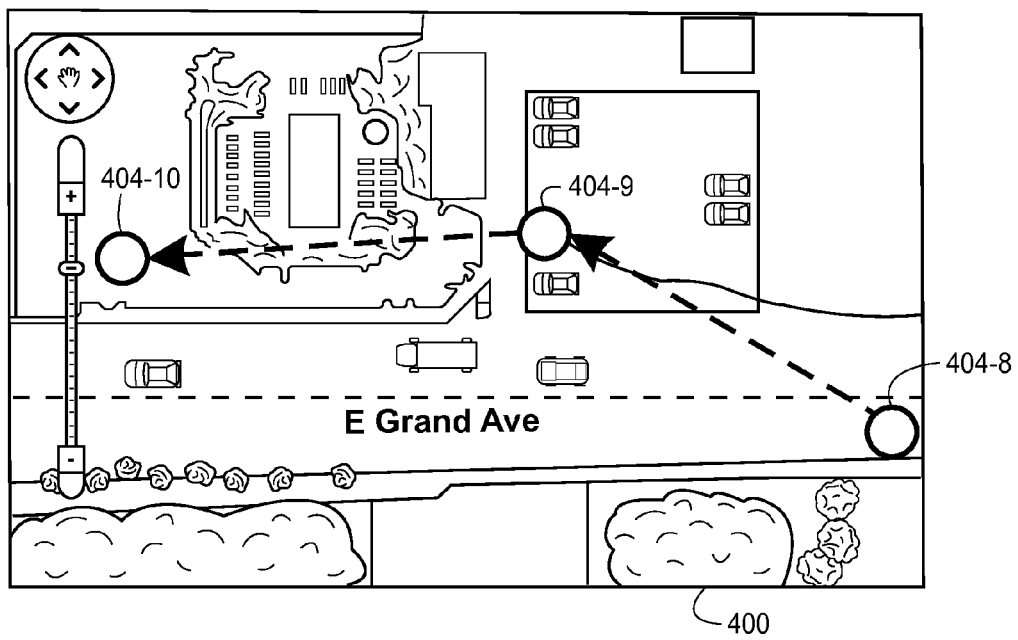
FIG. 6 is an example screenshot of a user interface via which an operator may enlarge a portion of a satellite image and adjust location data for one or more images.

FIG. 6 illustrates an example interactive screen 400 which the pose correction UI component 20 generates by enlarging a selected portion of the interactive screen 100 (see FIG. 3) in response to an operator command. Because the interactive screen 400 provides a more detailed view of the geographic area in which the poses represented by pose indicators 404-8, 404-9, and 404-10 are located, the operator may more precisely adjust the location of one or more of the pose indicators 404-8, 404-9, and 404-10. For example, the operator may move the pose indicator 404-8 from the left lane to the right lane of the road because the enlarged satellite image in the interactive screen 400 appears to show that the road is a two-way divided street. In an embodiment, the pose correction UI component 20 displays additional road information, such as lane assignment (one-way traffic only in all lanes, two lanes in one direction and one lane in the opposite direction, etc.) in response to an operator command or automatically for a certain zoom level, for example.

Figure 7:
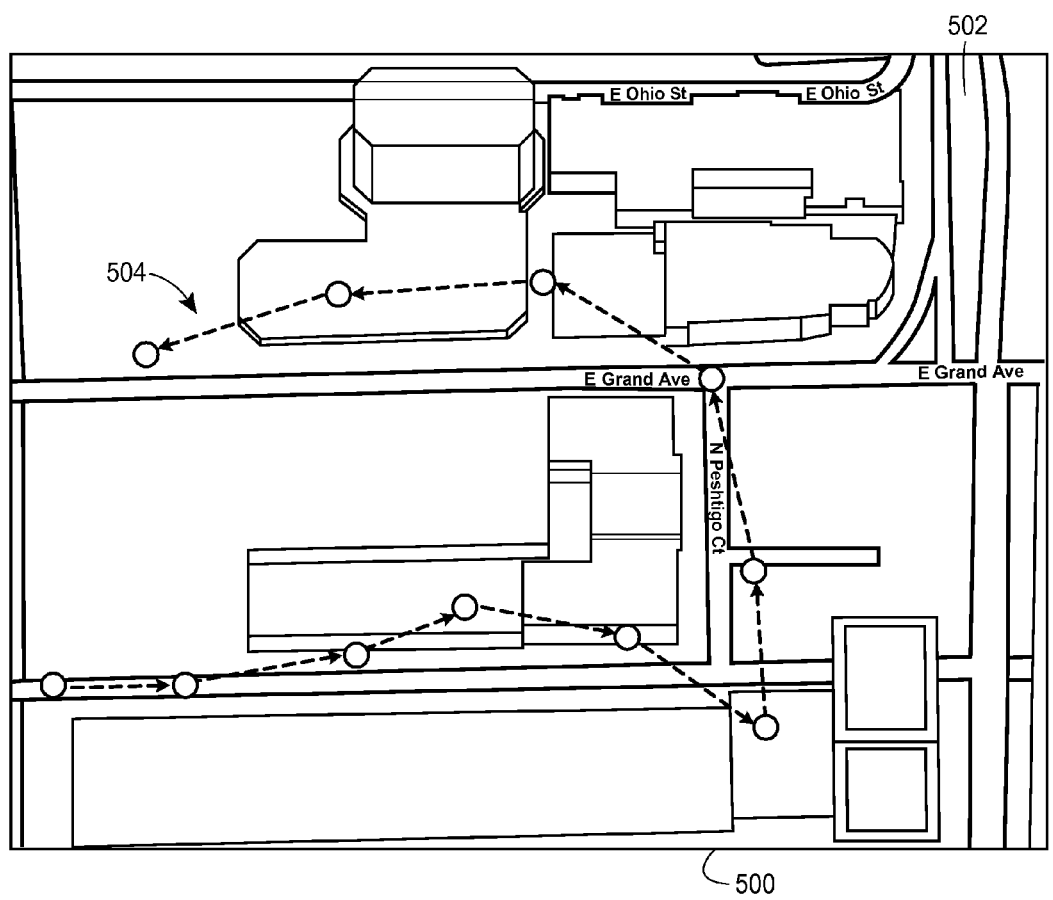
FIG. 7 is another example screenshot of a user interface via which an operator may adjust location data for images using the techniques of the present disclosure.

Although the interactive screens 100, 200, and 300 discussed above utilize satellite imagery to represent a geographic area, the pose rendering engine 22 and/or the pose correction UI component 20 in other embodiments or configurations may render the geographic area as a street map, a topographic map, or any other suitable type of a map. For example, FIG. 7 illustrates an interactive screen 500 that includes a street map 502, displayed in the background, and a series of pose indicators 504, displayed in the foreground. In an embodiment, the operator can switch between a satellite view and a street map view, for example, according to the operator's preference. Generally speaking, the image positioning system 10 may provide interactive screens, similar to the examples illustrated in FIGS. 3-7, that can be configured according to the desired type (e.g., satellite, schematic, topographic), level of detail, color, amount and type of labeling, etc.

In general, the image positioning UI component 20, the pose rendering engine 22 and the pose correction engine 24 may be implemented on dedicated hosts such as personal computers or servers, in a "cloud computing" environment or another distributed computing environment, or in any other suitable manner. The functionality of these and other components of the image positioning system 10 may be distributed among any suitable number of hosts in any desired manner. To this end, the image positioning UI component 20, the pose rendering engine 22, and the pose correction engine 24 may be implemented using software, firmware, hardware, or any combination thereof. To illustrate how the techniques of the present disclosure can be implemented by way of more specific examples, several devices that can be used in the image positioning system 10 are discussed next with reference to FIGS. 8 and 9. Further, another embodiment of an image positioning system, in which multiple operators may verify and adjust image positions via a crowdsourcing server, is discussed with reference to FIG. 11.

Figure 8:
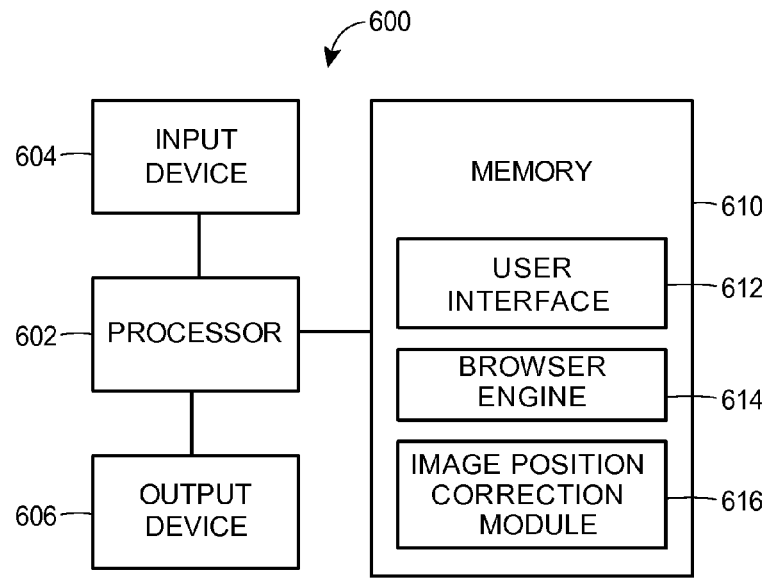
FIG. 8 is a block diagram of an example computing device which an operator can use in the image positioning system of FIG. 1 to correct pose data using the techniques of the present disclosure.

Referring to FIG. 8, a computing device 600 may be used as the computing device 14 in the image positioning system 10, for example. Depending on the embodiment, the computing device 600 may be a workstation, a PC (a desktop computer, a laptop computer, a tablet PC, etc.), a special-purpose device for verifying and adjusting image positioning data in the image positioning system 10, a smartphone, etc. The computing device 600 includes at least one processor 602, one or several input devices 604, one or several output devices 606, and a computer-readable memory 610. In an embodiment, the processor 602 is a general-purpose processor. In another embodiment, the processor 602 includes dedicated circuitry or logic that is permanently configured (e.g., as a special-purpose processor, such as a field programmable gate array (FPGA) or an application-specific integrated circuit (ASIC)) to perform certain operations. The computing device 600 may utilize any suitable operating system (OS) such as Android™, for example. Depending on the embodiment, the input device 604 may include, for example, a mouse, a touchpad, a keyboard, a touchscreen, or a voice input device, and the output device 606 may include a computer monitor, a touchscreen, or another type of a display device.

The memory 610 may be a persistent storage device that stores several computer program modules executable on the processor 602. In an embodiment, the memory 610 may store a user interface module 612, a browser engine 614, an image position correction module 616. During operation of the computing device 600, the user interface module 612 supports the interaction between various computer program modules executable on the processor 602 and the input device 604 as well as the output device 606. In an embodiment, the user interface module 612 is provided as a component of the OS of the computing device 600. Similarly, the browser engine 614 may be provided as a component of the OS or, in another embodiment, as a portion of a browser application executable on the processor 602. The browser engine 614 may support one or several communication schemes, such as TCP/IP and HTTP(S), required to provide communications between the computing device 600 and another device, e.g., a network host.

With continued reference to FIG. 8, the image position correction module 616 implements at least a portion of the functionality of the pose correction UI component 20. Depending on the embodiment, the image position correction module 616 may be a plugin compatible with a browser application that utilizes the browser engine 614, or a standalone application that interacts with the browser engine 614 to communicate with other devices, for example. In operation, the image position correction module 616 may utilize the user interface 612 receive and process operator commands and provide interactive screens similar to those illustrated in FIGS. 3-7 to the operator.

Figure 9:
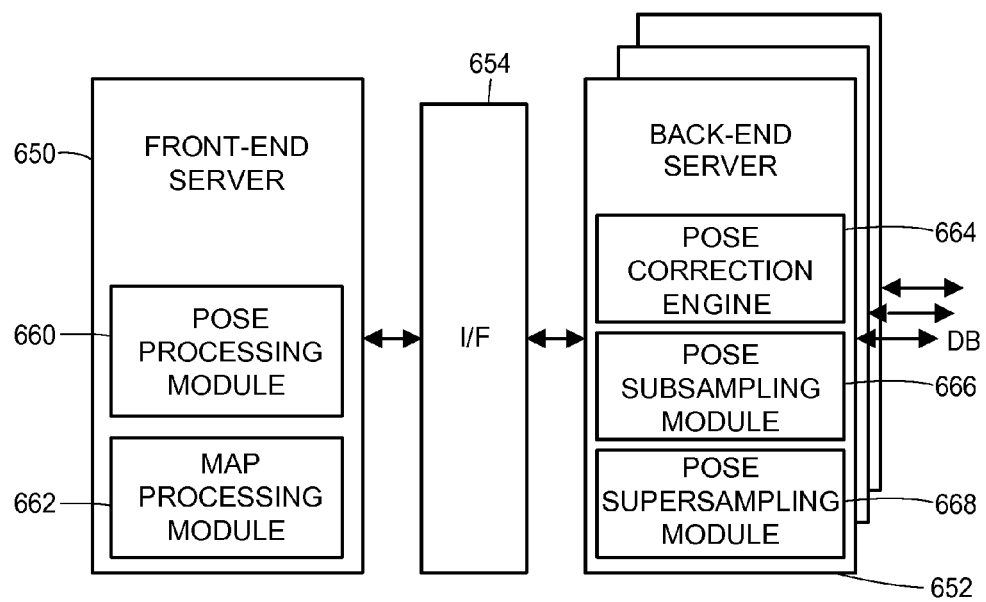
FIG. 9 is a block diagram of an example back-end server and an example front-end server that operate in the image positioning system of FIG. 1 to support the pose correction techniques of the present disclosure.

FIG. 9 illustrates an example front-end server 650 communicatively coupled to a back-end server 652 via a network interface 654, which may include one or more local area networks or wide area networks interconnected in a wired or wireless manner. For example, the servers 650 and 652 may communicate via an Ethernet link. Each of the front-end server 650 and the back-end server 652 may have any suitable hardware and software architecture. For example, the servers 650 and 652 may include one or several processors, network interface modules (e.g., one or several network cards), computer-readable memory modules to store computer programs executable on the corresponding processors (none shown), etc. To better balance the distribution of various computing tasks, the front-end server 650 in some implementations interacts with multiple back-end servers 652. For example, the front-end server 650 may select a back-end server from among several back-end servers 652 based on the processing power available at each server. Further, in an embodiment, some or all back-end servers 652 also interact with multiple front-end servers 650.

The front-end server 650 may execute a pose processing module 660 and a map processing module 662 to retrieve, render, and position foreground pose data and background map data, respectively. Referring back to FIG. 2, the modules 660 and 662 may be components of the pose rendering engine 660. The back-end server 664 may include a pose correction engine 664. In an embodiment, the pose correction engine 664 operates as the pose correction engine 34. Further, in some embodiments, the back-end server 664 includes a pose subsampling module 666 that may be configured to subsample pose data from 100 Hz to 1 Hz or less, for example. Still further, in an embodiment, the back-end server 664 includes a pose supersampling module 668 that may be configured to generate a fuller set of poses (e.g., corresponding to the 100 Hz rate) based on a sparse set of poses (e.g., corresponding to the 1 Hz rate or less). The pose correction engine 664 also may include a pose database, such as the image and pose database 12 illustrated in FIG. 1, for example, as a component. In other embodiments, the back-end server 664 may communicate with a pose database implemented in a separate device.

Figure 10:
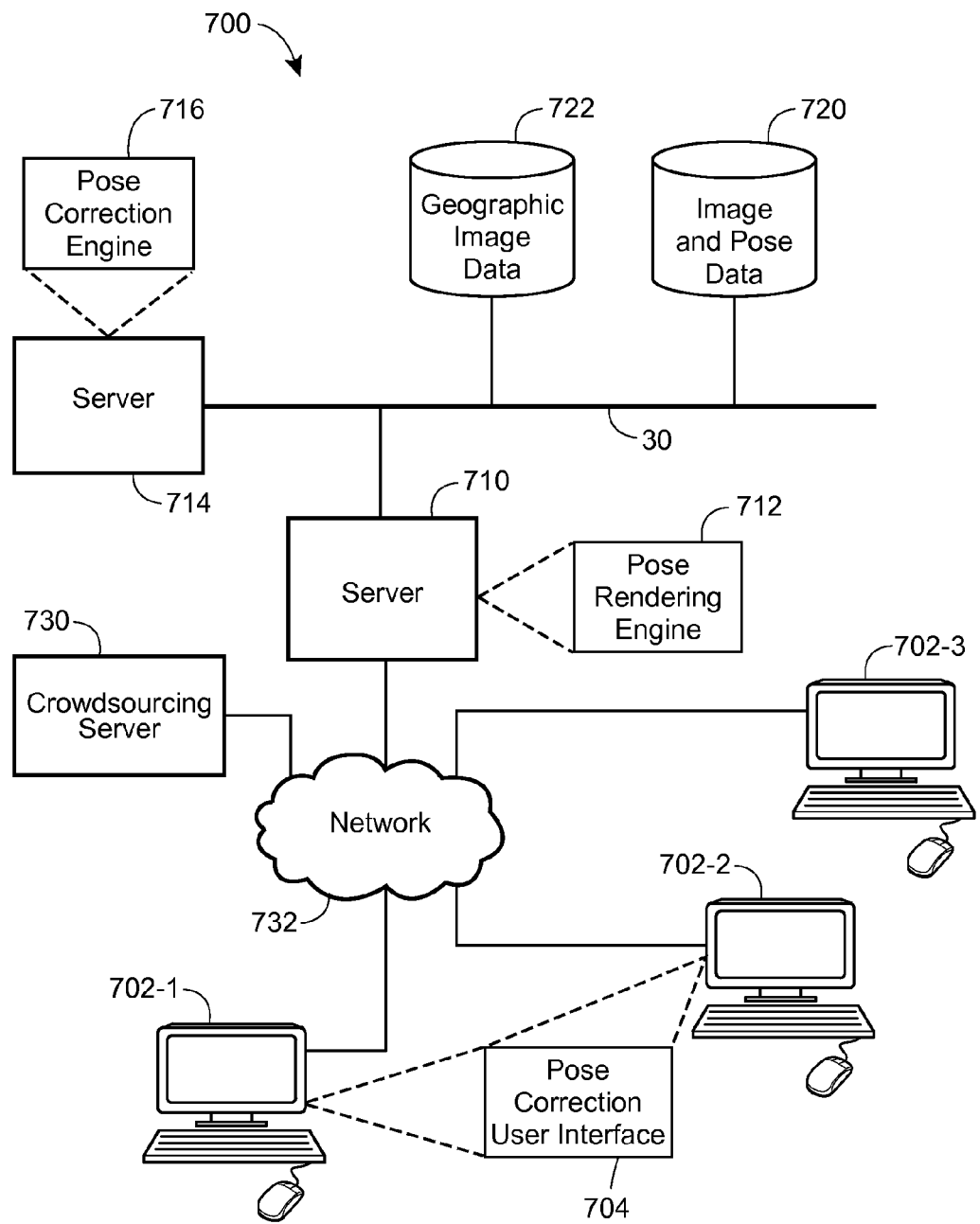
FIG. 10 is a block diagram of an image positioning system in which a crowdsourcing server is utilized to implement the pose correction techniques of the present disclosure.

Now referring to FIG. 10, an example image positioning system 700 includes several computing devices 702-1, 702-2, and 702-3, each of which implements a pose correction UI component 704, a front-end server 710 that implements a pose rendering engine 712, a back-end server 714 that implements a pose correction engine 716, an image and pose database 720, and a geographic image database 722. A crowdsourcing server 730 is coupled to the computing devices 702-1, 702-2, and 702-3 and the servers 714 and 716 via a network 732 to allow a greater number of human operators to participate in verification and correction of pose data.

In general, the crowdsourcing server 730 uses human operators to verify and, when necessary, correct image positioning in the image positioning system 700. The crowdsourcing server 730 receives human intelligence tasks (HITs) to be completed by operators using the computing devices 702-1, 702-2, and 702-3. In particular, the HITs specify pose runs stored in the image and pose database 720 that require verification correction. The crowdsourcing server 730 may support one or several application programming interface functions (APIs) to allow a requestor, such as an administrator responsible for the image and pose database 720, to specify how a HIT is to be completed. For example, the HIT may automatically link an operator that uses the computing devices 702-1 to a site from which the necessary plugin or application (e.g., the image position correction module 616 of FIG. 8) can be downloaded, specify which pose runs are available for verification, and list various other conditions for completing a pose run verification task. In an embodiment, the crowdsourcing server 730 receives a HIT that specifies multiple pose runs, automatically distributes the pose runs among several computing devices, and manages the status of the tasks assigned to the computing devices. Further, according to an embodiment, the crowdsourcing server 730 receives pose data corresponding to one or several pose runs for each HIT. For example, the back-end server 714 may retrieve a set of pose data records from the image and pose database 720, forward the retrieved set to the crowdsourcing server 730 and, upon completion of the corresponding task at the crowdsourcing server 730, receive the updated set of pose data from the crowdsourcing server 730. The back-end server 714 may then update the image and pose database 720.

Further, the crowdsourcing server 730, alone or in cooperation with the servers 712 and 714, may automatically determine whether particular operators are qualified for pose run verification. For example, when a candidate operator requests that a certain pose verification task be assigned to her, a component in the image positioning system 700 may request that the operator provide her residence information (e.g., city and state in which she lives), compare the geographic area with which the pose run is associated to the candidate operator's residence information, and determine whether the operator is likely to be familiar with the geographic area. Additionally or alternatively, the image positioning system 700 may check the candidate operator's age, his prior experience completing image positioning tasks, etc. The back-end server 714 or another component of the image positioning system 700 may periodically poll the crowdsourcing server 730 to determine which HITs are completed. In an embodiment, the crowdsourcing server 730 operates as a component in the Mechanical Turk system from Amazon.com, Inc.

Several example methods that may be implemented by the components discussed above are discussed next with reference to FIGS. 11-13. As one example, the methods of FIGS. 11-13 may be implemented as computer programs stored on the tangible, non-transitory computer-readable medium (such as one or several hard disk drives) and executable on one or several processors. Although the methods of FIGS. 11-13 can be executed on individual computers, such as servers or PCs, it is also possible to implement at least some of these methods in a distributed manner using several computers, e.g., using a cloud computing environment.

Figure 11:
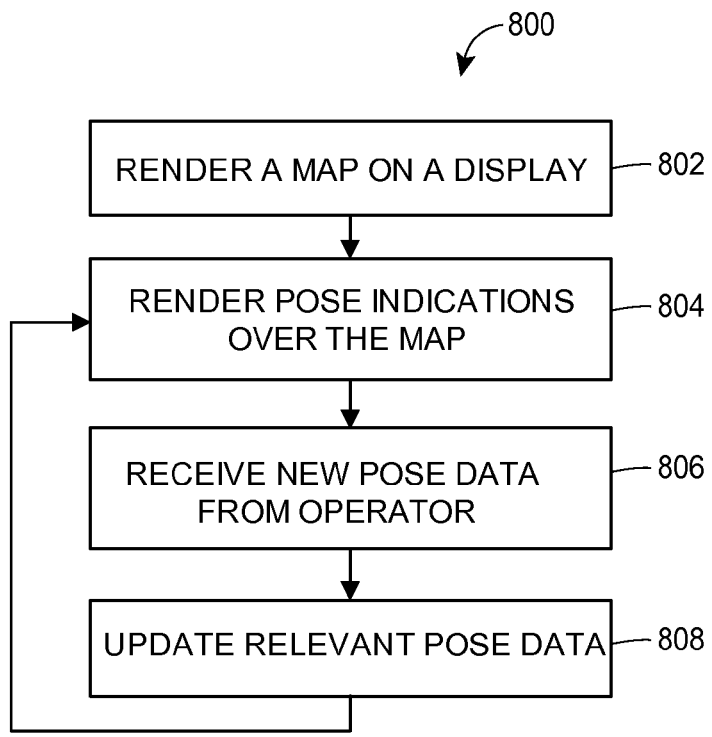
FIG. 11 is a flow diagram of an example method for correcting pose data.

FIG. 11 is a flow diagram of an example method 800 for correcting pose data, according to an embodiment. The method 800 may be implemented in the pose correction UI component 20 in the computing device 14 (see FIG. 1) or the computing devices 702-1, 702-2, and 702-3, for example. In an embodiment, the pose correction UI component 20 and/or the pose correction UI component 704 includes the method 800 as a feature. At block 802, a map is rendered in an interactive screen on a display of a computing device. Depending on the implementation or configuration, another visual representation of a geographic area, such as a satellite image, may be rendered instead of the map. It is also possible to render a hybrid view of the geographic area, such as a satellite image with map data (road labels, municipal or state boundaries, etc.). In an embodiment, the pose rendering engine 22 or 712 generates the map as a raster image or vector data, forwards the raster image or the vector data to the pose correction UI component 20 or 704, and the pose correction UI component 20 or 704 renders the raster image or the vector data on the display.

At block 804, visual pose indications are rendered in the interactive screen over the map or other visual representation of the geographic area generated at block 802. For example, pose indications may be pose indicators that are superimposed on the map in accordance with the corresponding location data. The pose indicators may define an upper layer in the interactive visualization, and the map may define a lower layer in the interactive visualization. In this manner, the pose correction UI component 20 or 704 can easily re-render pose indicators in response to operator commands while keeping the background map image static. In some embodiments, the pose rendering engine 22 or 712 generates the pose indicators as a raster image, forwards the raster image to the pose correction UI component 20 or 704, and the pose correction UI component 20 or 704 renders the raster image on the display. In one such embodiment, the pose rendering engine 22 or 712 generates a raster image that includes both the map data and the pose indicators. In another embodiment, the pose correction UI component 20 or 704 receives a map image from the pose rendering engine 22 or 712, superimposes pose indicators onto the received map image, and renders the resulting image on the display.

At block 806, pose corrections (or adjustments) are received from the operator. For example, the operator may use a pointing device, such as a mouse or a touchpad, to select a pose indicator and move the pose indicator to a new position in the interactive screen. The operating system may process several events received from the pointing device and forward the processed events to the pose correction UI component 20 or 704. If needed, the operator may adjust multiple poses at block 806. Next, at block 808, pose data is updated in accordance with the adjusted positions of the corresponding pose indicators. According to an embodiment, the operator activates a control in the interactive screen (e.g., a "submit" button) to trigger an update of the appropriate records in the image and pose database 12 or 720. In another embodiment, the image and pose database 12 or 720 is updated after the operator adjusts a certain number of poses. In yet another embodiment, the image and pose database 12 or 720 is updated periodically, e.g., once every two minutes. Once pose data is updated at block 808, the flow returns to block 804, unless the operator terminates the method 800.

Figure 12:
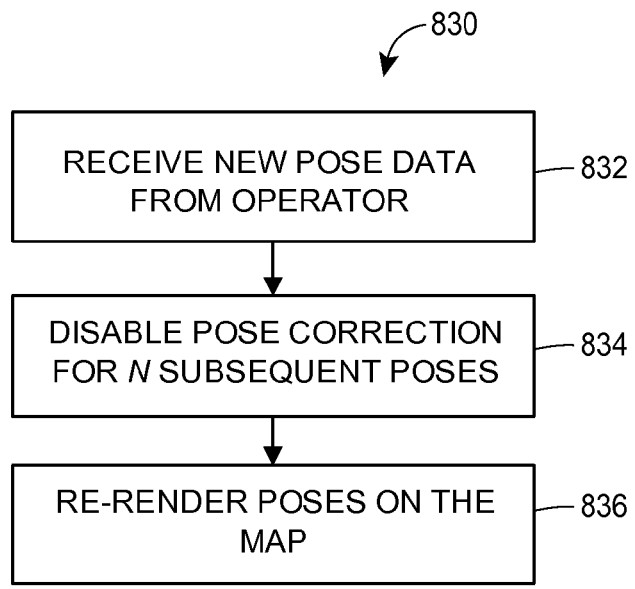
FIG. 12 is a flow diagram of an example method for receiving pose correction data from a user interface.

FIG. 12 is a flow diagram of an example method 830 for receiving adjusted pose data from an operator. The method 800 may be implemented in the pose rendering engine 712, the pose correction UI component 20 or 704, or implemented partially in the pose rendering engine 712 and partially in the pose correction UI component 20 or 704, for example. In an embodiment, the method 800 is executed at block 806 discussed with reference to FIG. 11.

At block 832, an adjusted pose, e.g., a new position of a pose indicator in an interactive screen, is received from an operator via an interactive screen. In response, at block 834, the pose correction UI component 20 or 704 may disable pose correction for N (e.g., five, ten) subsequent poses to prevent the operator from attempting to move every pose that appears to be incorrect. The poses for which correction is disabled may be selected along the direction in which the corresponding pose run progresses or along both directions, depending on the implementation. In an embodiment, the number N is configurable. To indicate that the N poses subsequent or adjacent to the adjusted pose cannot be modified, the corresponding pose indicators may be rendered using a different color, a different pictogram or symbol, or in any other manner. At block 836, a pose indicator corresponding to the adjusted pose, as well as pose indicators corresponding to the poses for which correction is disabled, are rendered in the appropriate positions in the interactive screen.

Figure 13:
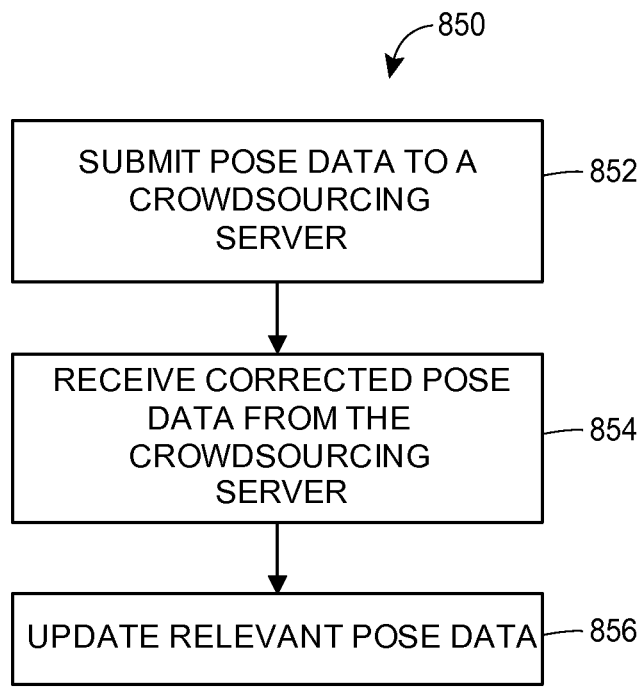
FIG. 13 is a flow diagram of an example method for correcting pose data using a crowdsourcing server.

FIG. 13 is a flow diagram of an example method 850 for correcting pose data using a crowdsourcing server that can be implemented, for example, in the back-end server 714 (see FIG. 10). At block 852, pose data corresponding to one or several pose runs is submitted to a crowdsourcing server. After the submitted pose data is processed and corrected, updated pose data is received from the crowdsourcing server at block 854. At block 856, the received pose data is applied to a database, such as the image and pose database 720, for example.

Vehicle Trajectory Correction System

Referring back to FIG. 1, in an embodiment, the pose correction engine 34 operates the in the vehicle trajectory correction system 11 to automatically modify pose data in view of one or several user modifications so as to develop a corrected trajectory that agrees, as much as possible, with the user modifications, which may be expressed as an optimization constraint, and one or more other constraints. An example of a pose correction engine, that may operate as the pose correction engine 34 or 664, is discussed below with reference to FIG. 16. First, however, certain principles that apply to correcting a vehicle trajectory according to the techniques of the present disclosure are generally discussed with reference to FIGS. 14 and 15.

Figure 14:
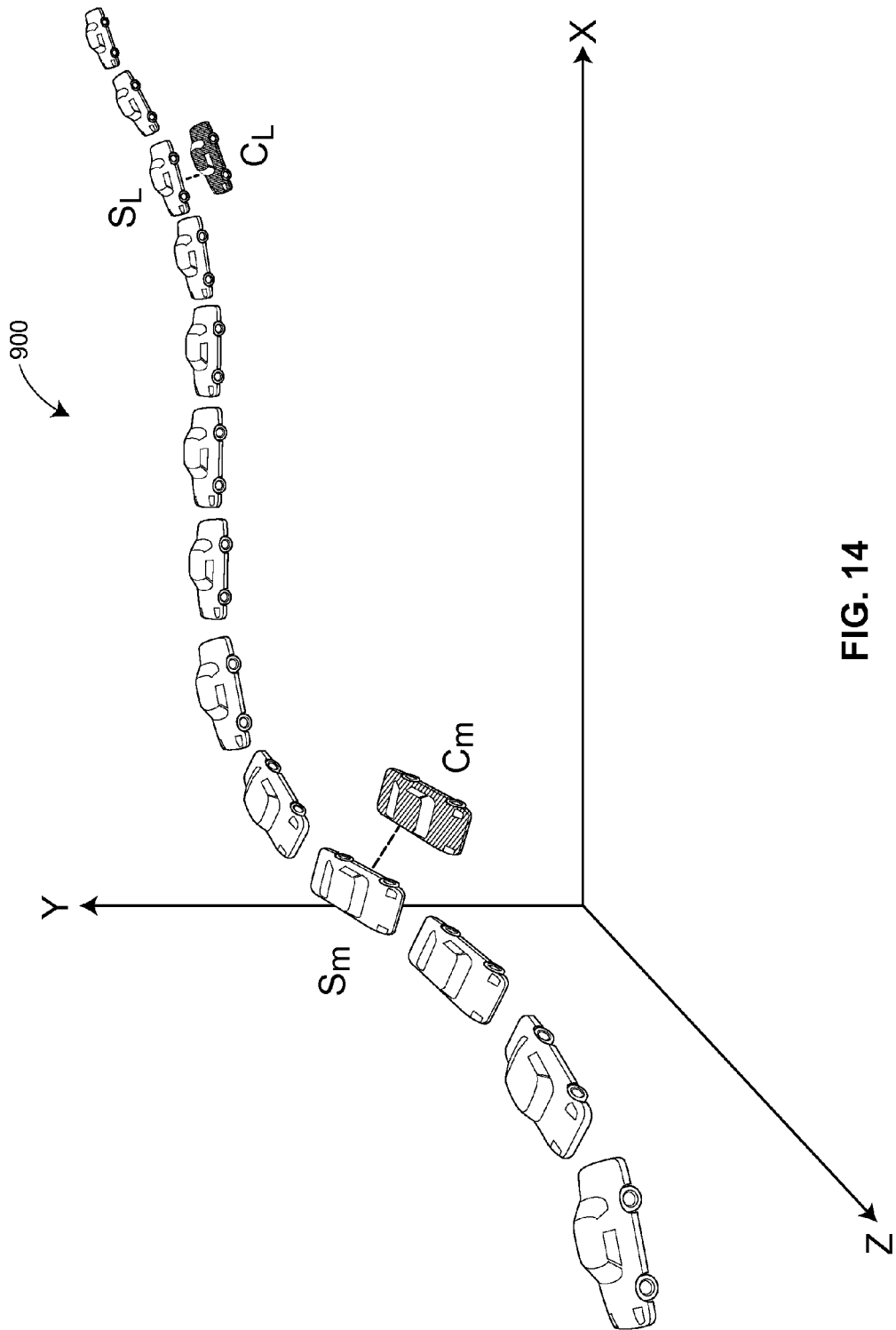
FIG. 14 is a diagram of an example approximate trajectory of a vehicle based on pose samples that include reported GPS coordinates, in which several samples are modified by a user.

FIG. 14 is a diagram of an example approximate trajectory 900 of a vehicle moving in a three-dimensional coordinate system. In an embodiment, prior to correction, the approximate trajectory 900 is described by a set of pose samples $S=\{s_1, s_2, \ldots, s_N\}$, several of which are illustrated in FIG. 14 using an image of a car. Each pose sample $s_i$ indicates an original three-dimensional location $\tilde{p}_i$ and an original three-dimensional orientation $\tilde{q}_i$. In an embodiment, the three-dimensional location $\tilde{p}_i$ is generated using an absolute positioning data, such as a GPS reading $g_i$, and relative positioning data, such as IMU and wheel odometry readings.

The set of pose samples S may be generated by sub-sampling pose data associated with a pose run. For example, pose data P for a pose run R may include pose samples collected at ten-millisecond intervals. To reduce the number of pose samples to which an optimization technique is applied, the pose data P may be sub-sampled at the rate of 1/1,000, to consider just one example, to generate the sub-sampled set S. After the trajectory 900 corresponding to the set S is modified, the changes may be automatically propagated to the rest of pose data P.

Typically, most of the inaccuracies in the approximate trajectory 900 are due to GPS errors. As discussed above, GPS is often unreliable. On the other hand, IMU and wheel odometry data usually provides reliable and accurate data. As a result, locally, the approximate trajectory 900 may have a mostly constant shift relative to the actual trajectory of the vehicle. The approximate trajectory 900 thus may be inaccurate in absolute terms. The shape of the trajectory 900, however, is likely to be mostly accurate due to the contribution of reliable relative positioning data.

An operator may modify the pose sample $s_M$ using the interactive interface discussed above with reference to FIGS. 3-7, for example. In the example of FIG. 14, the operator assigns a new location $c_M$ to the pose sample $s_M$ and a new location $c_L$ to the pose sample $s_L$. According to some embodiments, the operator modifies the location of the vehicle corresponding to the pose sample $s_M$ or $s_L$ in only two dimensions, i.e., on a plane. Further, to make vehicle trajectory correction more efficient, the operator is not permitted to modify the orientation of the vehicle for any of the pose samples, according to an embodiment. However, the vehicle trajectory correction system 11 or a similar system in some cases may automatically adjust the originally reported orientation reading $\tilde{q}_M$ in view of the operator-assigned location $c_M$ and one or several adjacent pose samples, as discussed below.

In other embodiments, the operator may be permitted to modify the location of a vehicle for a particular sample in all three dimensions. To this end, the pose correction user interface 20 or a similar interface may render pose indicators, some of which may be moveable, over a three-dimensional representation of a geographic area.

A pose correction engine or a similar component may generate an optimal set of pose samples $X=\{x_1, x_2, \ldots, x_N\}$ that satisfies, as much as possible, a set of constraints C for the N pose samples being optimized. Each pose sample $x_i$ in the set X indicates a location $p_i$ of the vehicle in the three-dimensional coordinate system and an orientation $q_i$ of the vehicle in the three-dimensional coordinate system. In an embodiment, the location $p_i$ corresponds to a set of GPS coordinates. In another embodiment, the location $p_i$ is derived from a set of GPS coordinates, IMU data, and wheel odometry data. The orientation $q_i$ may be represented using a set of roll, pitch, and yaw angles, a Rodrigues rotation vector, or a quaternion, for example. In the example embodiments discussed herein, a pose sample $x_i$ represents a transformation of a point $p_L$ in a local frame of reference L of the vehicle to a point $p_G$ in the global frame of reference G, and is given by:

$$p_G = R(q_i) \cdot p_L + p_i \qquad \text{(Eq. 1)}$$

where $R(q_i)$ is a three-by-three rotation matrix for the quaternion $q_i$. However, in other embodiments, a pose sample $x_i$ may correspond to other coordinates that may be local, global, relative, etc.

The set of constraints C may be expressed through optimization terms having different strengths. In an embodiment, each optimization term is an energy function that enforces the corresponding constraint, and can be expressed as:

$$T = f(S(x)) \qquad \text{(Eq. 2)}$$

where $S(x)$ is a subset of the pose samples, and $f(S(x))$ is a function that defines energy penalty over $S(x)$. Pose samples that violate the constraint T contribute to high energy. The total amount of energy associated with a certain solution may be defined as a sum of the energies contributed by all terms T. Accordingly, the optimal set of pose samples X has the lowest possible total amount of energy due to all terms T corresponding to the set of constraints C.

In some embodiments, a vehicle trajectory correction system identifies the actual optimal solution for a set of constraints C. In other embodiments, the vehicle trajectory correction system finds a near-optimal solution, e.g., a solution associated with a total amount of energy that is below a certain threshold value but is not necessarily the optimal solution, so as to reduce the amount of computation and thereby improve user experience. Further, according to some embodiments, a set of pose samples being optimized corresponds to only a sub-set of pose samples defining a certain vehicle trajectory. For example, the set of pose samples being optimized may be generated by sub-sampling the original pose data. In general, according to the techniques of the present disclosure, a set of pose samples X that satisfies the set of constraints C may provide a satisfactory solution to the optimization problem, and may be referred to as being "optimal," even though a better solution to the optimization problem potentially may exist.

In an embodiment, the optimization terms include a location term that constrains the difference between the reported location (or a component of the reported location) and the automatically generated corrected location for a particular pose sample. More specifically, the location term may represent a location constraint that seeks to preserve the reported location of the vehicle. For example, in an embodiment, the location term is a GPS term. Because GPS typically is associated with a large margin of error, especially in urban canyons, the GPS term may be relatively weak. In other words, the vehicle trajectory correction system may aggressively modify GPS data in pose samples to accommodate other optimization constraints. The GPS term may be a singleton term that is computed over a single pose sample. In an embodiment, the GPS term is given by:

$$T_{GPS}(x_i) = (x_i - g_i)^T \Sigma_{g_i}^{-1} (x_i - g_i) \qquad \text{(Eq. 3)}$$

where $g_i$ is a reported GPS reading associated with the pose sample $x_i$, and where $\Sigma_g$ is a three-by-three covariance matrix that determines the strength of the term $T_{GPS}$ (which may be relatively low, as indicated above).

Further, to robusify the GPS term, the function $T_{GPS}(x_i)$ in some embodiments is replaced with a function of the form $\rho(T_{GPS}(x_i))$, where $\rho$ is a Cauchy robust function, Huber robust function, or another suitable robust function. In this manner, GPS outlier readings may be efficiently addressed (e.g., suppressed).

In an embodiment, the optimization terms also include a user correction or modification term that constrains the difference between user modifications and automatically generated corrections for certain pose samples. The user modification term may be a relatively strong term representing a user modification constraint that preserves, to the extent possible, a user modification of a pose sample. In other words, the vehicle trajectory correction system may strongly enforce user modifications relative to other constraints. The user modification term may be expressed as:

$$T_{UC}(x_i) = (x_i - c_i)^T \Sigma_{UC_i}^{-1} (x_i - c_i) \qquad \text{(Eq. 4)}$$

where $c_i$ is a user-assigned location for a pose sample $x_i$. The term $T_{UC}(x_i)$ is generally similar to the term $T_{GPS}$, but the values on the diagonal of the covariance matrix $\Sigma_{UC_i}$ are smaller relative to the corresponding values in the matrix $\Sigma_{g_i}$ so as to make the term $T_{UC}(x_i)$ stronger than the term $T_{GPS}(x_i)$. Further, in those embodiments where the operator is limited to modifying pose data in two dimensions only, the z-dimension penalty may be smaller, so that $\Sigma_{UC}(0,0) < \Sigma_{UC}(2,2)$, and $\Sigma_{UC}(1,1) < \Sigma_{UC}(2,2)$.

The optimization terms also may include a relative translation term $T_{RT}(x_i, x_j)$ representing a relative translation constraint that seeks to preserve a relationship between positions of a vehicle corresponding to a pair of pose samples $x_i$ and $x_j$, relative to the originally reported pose samples $\tilde{x}_i$ and $\tilde{x}_j$. In other words, the relative translation constraint preserves a relative position and orientation between a pair of poses. With continued reference to FIG. 14, the approximate trajectory 900 may be analogized to a string, in which case the relative translation term $T_{RT}(x_i, x_j)$ prevents excessive deformation or stretching of the string. In an embodiment, the use of the relative translation term $T_{RT}(x_i, x_j)$ allows not using explicit accelerometer, gyrometer, and wheel odometer in vehicle trajectory optimization. In particular, because the pair of pose samples $\tilde{x}_i$ and $\tilde{x}_j$ were obtained using at least some of accelerometer, gyrometer, and wheel odometer data, the pose samples $\tilde{x}_i$ and $\tilde{x}_j$ usually can be assumed to accurately reflect the relative positioning of the vehicle at the corresponding locations. In an embodiment, the original relative orientation term $\Delta_{i,j}$ can be computed as follows:

$$\Delta_{i,j} = R(\tilde{q}_i)^T (\tilde{p}_j - \tilde{q}_i) \qquad \text{(Eq. 5)}$$

where $R(q_i)$ is a three-by-three rotation matrix corresponding to the quaternion $q_i$. The relative translation term $T_{RT}(x_i, x_j)$ is then given by:

$$T_{RT}(x_i, x_j) = \frac{1}{\sigma_{RT}^2} \|R(q_i)^T (p_j - p_i) - \Delta_{i,j}\|^2, \qquad \text{(Eq. 6)}$$

where $\sigma_{RT}^2$ is a standard deviation (or another number) that reflects the strength of the term $T_{RT}(x_i, x_j)$, and $R(q_i)$ is a three-by-three rotation matrix for the quaternion $q_i$. In at least some of the embodiments, the term $T_{RT}(x_i,x_j)$ is relatively strong, and a portion of the approximate trajectory between the pair of pose samples $x_i$ and $x_j$ is well preserved.

Further, the optimization terms may include a relative rotation term $T_{RR}(x_i,x_j)$ representing a constraint that seeks to preserve a relationship between orientations of a vehicle corresponding to a pair of pose samples $x_i$ and $x_j$, relative to the originally reported pose samples $\tilde{x}_i$ and $\tilde{x}_j$. To continue with the analogy of a string introduced above, the relative rotation term $T_{RR}(x_i,x_j)$ prevents the string from excessive twisting, similar to the relative translation term $T_{RT}(x_i,x_j)$ preventing the string from excessive stretching. In an embodiment, the original relative orientation $\Omega_{i,j}$ can be expressed as:

$$\Omega_{i,j} = \tilde{q}_j \tilde{q}_i^{-1} \qquad \text{(Eq. 7)}$$

and the relative rotation term $T_{RR}(x_i,x_j)$ can be expressed as $$T_{RR}(x_i, x_j) = \frac{1}{\sigma_{RR}^2} \|Norm(\Omega_{i,j} \cdot q_i \cdot q_j^{-1}) - [1\ 0\ 0\ 0]^T\|^2, \qquad \text{(Eq. 8)}$$

where Norm denotes a normalization of a quaternion to unit length, and the term $\sigma_{RR}^2$ is a parameter that reflects the strength of the term $T_{RR}(x_i,x_j)$. It is noted that in other embodiments, the relative rotation and the relative translation term may be expressed differently.

Still further, the optimization terms may include a gravity preservation term representing a constraint that preserves, to the extent possible, the direction of the gravity force in a local coordinate system of the vehicle for one or several pose samples. In the local coordinate system of the vehicle, the original gravity direction vector may be expressed as:

$$\gamma_i = R(\tilde{q}_i)^T \cdot [0\ 0\ 1]^T \qquad \text{(Eq. 9)}$$

and the gravity preservation term $T_G(x_i)$ may be expressed as:

$$T_G(x_i) = \frac{1}{\sigma_G^2} \|R(q_i)^T * [0\ 0\ 1]^T - \gamma_i\|^2 \qquad \text{(Eq. 10)}$$

where $\sigma_G^2$ is a parameter that reflects the strength of the term $T_G(x_i)$, and $R(q_i)$ is a three-by-three rotation matrix corresponding to the quaternion $q_i$.

In an at least some of the embodiments, the parameter $\sigma_{RR}$ differs from the parameter $\sigma_{RT}$ to enable trade-offs between twisting and stretching of the approximate trajectory 900. For example, the parameters $\sigma_{RT}$ and $\sigma_{RR}$ may selected so that during correction, the approximate trajectory 900 "resists" twisting more than stretching. It is also noted that in other embodiments, optimization terms other than the terms $T_{RT}(x_i,x_j)$, $T_{RR}(x_i,x_j)$, and $T_G(x_i)$ may be used to preserve the shape of the approximate trajectory 900 (or certain portions of the trajectory 900).

Figure 15:
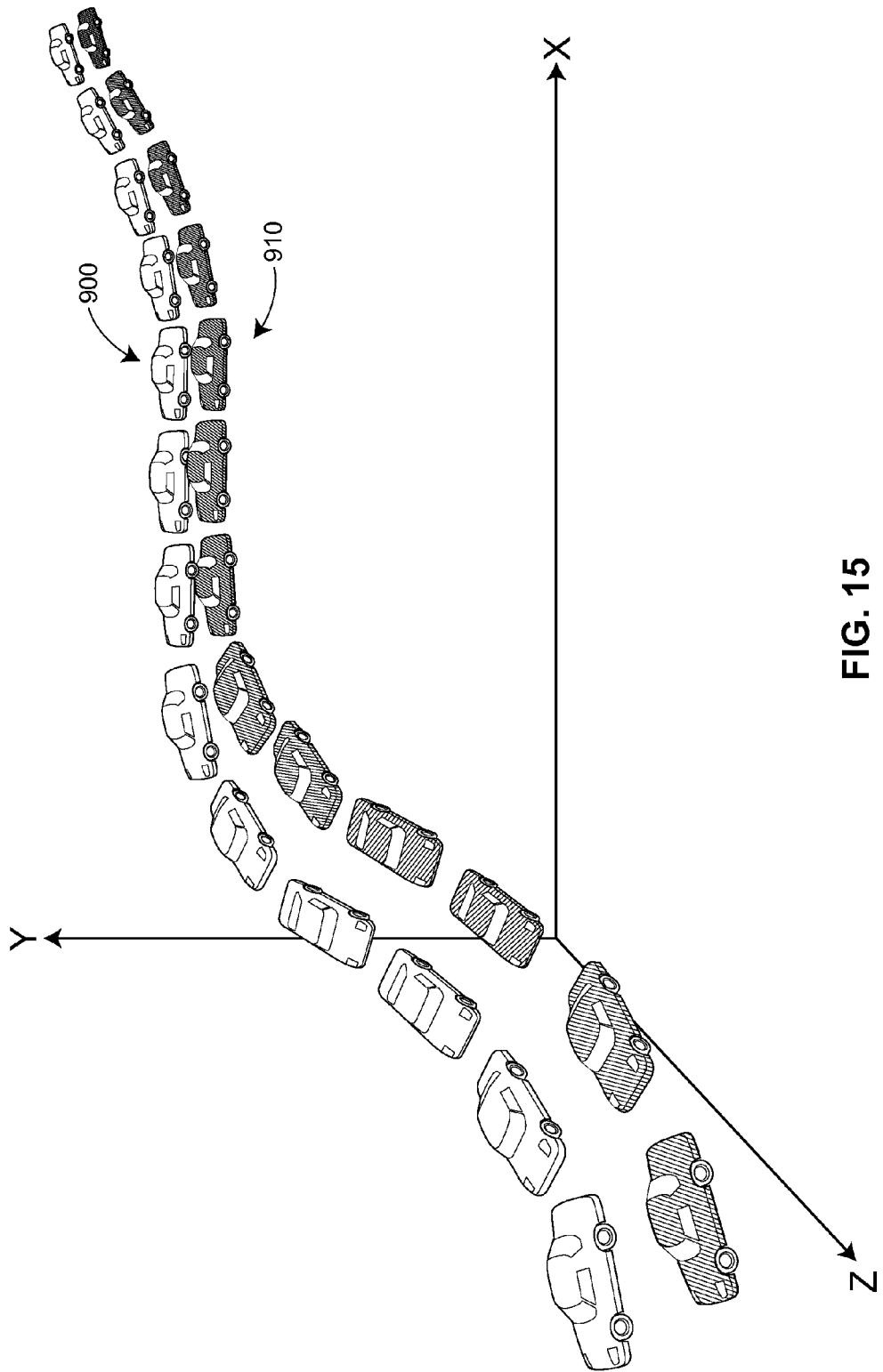
FIG. 15 is a schematic illustration of the trajectory of FIG. 14 that is automatically corrected in accordance with the techniques of the present disclosure in view of the user modifications.

Referring to FIG. 15, some or all of the optimization terms $T_{GPS}(x_i)$, $T_{UC}(x_i)$, $T_{RT}(x_i,x_j)$, $T_{RR}(x_i,x_j)$, and $T_G(x_i)$ discussed above may be used in an optimization scheme to modify the pose samples in the trajectory 900 in order to generate an optimal set of pose samples X corresponding to a corrected trajectory 910. In an embodiment, a local search optimization technique, such as a non-linear least-squares solution based on an iterative Levenberg-Marquardt algorithm, is used.

In the example of FIG. 15, the corrected trajectory 910 and the original approximate trajectory 900 appear to be separated by a constant or nearly constant offset. In those embodiments where an operator has a selection of two or maps over which pose indicators are displayed, the operator may be provided with an option to select the map that best agrees with the corrected trajectory 910. Further, in an embodiment, the offset between the trajectories 910 and 900 may be automatically computed and used in future trajectory adjustments or map alignment. For example, a certain map may have a constant or nearly constant position offset for a relatively large area, and the detected drift may be used to better align pose indicators or other data with the map.

Figure 16:
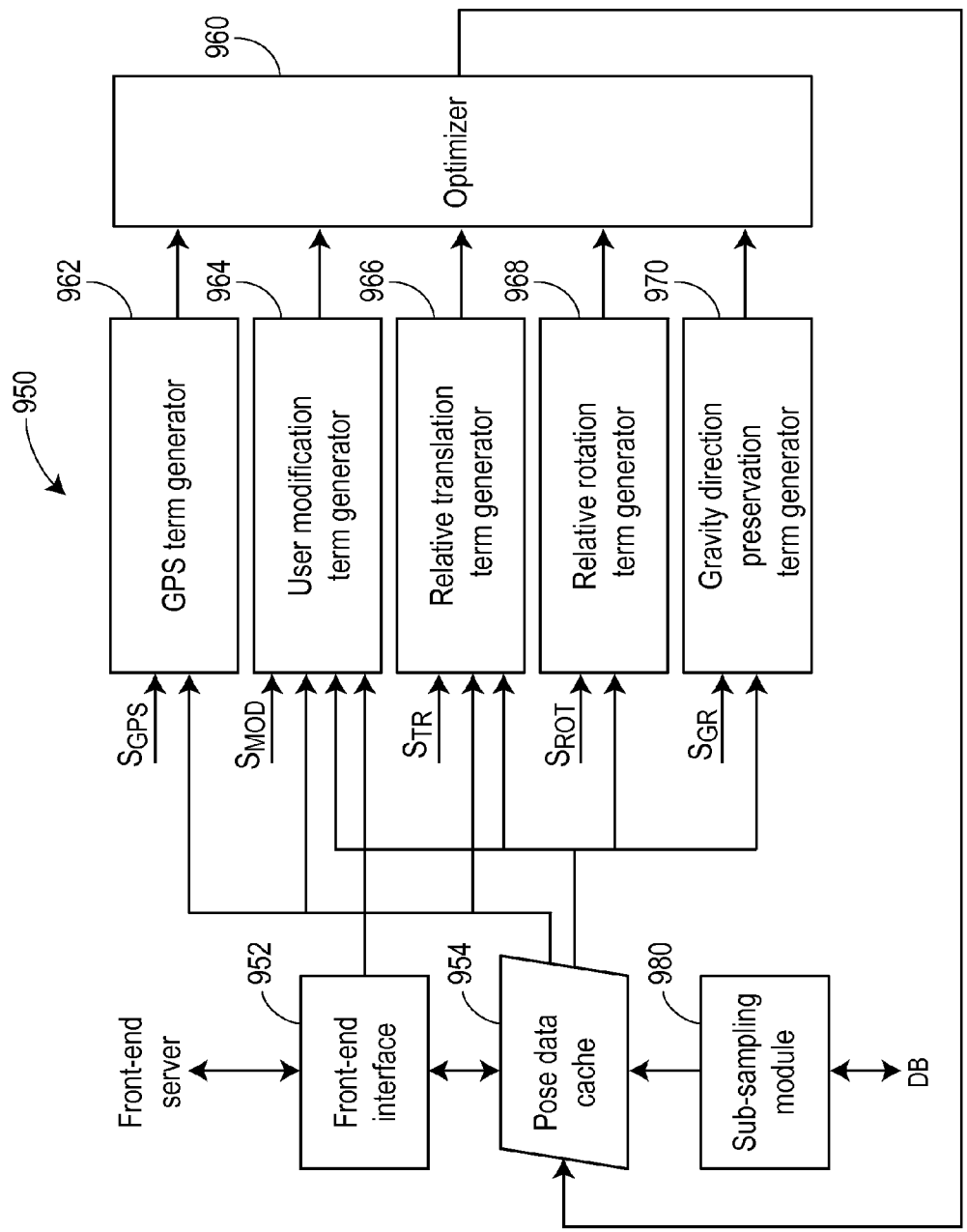
FIG. 16 is a block diagram of an example pose correction engine that operates in a vehicle trajectory correction system.

FIG. 16 is a block diagram of a pose correction engine 950 that operates in the vehicle trajectory correction system 11 of FIG. 1 or a similar vehicle trajectory correction system, according to an embodiment. The pose correction engine 950 may include a front-end interface 952 communicatively coupled to a cache memory module 954 (or the "pose data cache") that stores pose data and an optimizer module 960, also communicatively coupled to the pose data cache 954. A set of term generators 962, 964, 966, 968, and 970 are communicatively coupled to the optimizer module 960 to provide respective optimization term data, as discussed below. Further, in an embodiment, the pose correction engine 950 includes a sub-sampling module 980 to reduce pose data to a sub-sampled set on which optimization is performed.

Referring back to FIG. 1, for example, the pose correction engine 950 implemented in the back-end server 28 may use the front-end interface 952 to receive operator modifications to pose data from the front-end server 24 that, in turn, communicates with the pose correction user interface 20. The pose data cache 954 may store a set of pose samples which the front-end server 24 also provides to a user via the front-end interface 952, according to an embodiment. In this manner, the front-end server 24 may efficiently forward only those pose samples to the pose correction engine 950 that the user has modified (rather than an entire set of pose samples provided to the user). Each of the front-end server 24 and the back-end server 28 in this implementation may maintain the same or, at least, overlapping sets of pose samples in respective memory modules, and the vehicle trajectory correction system in which the servers 24 and 28 operate quickly and efficiently corrects vehicle trajectories without frequently transmitting large sets of data between network devices. Further, in at least some of the implementations of the interactive user interface, the set of pose samples provided to the user is a sub-sampled portion of the complete original pose data. As discussed above, pose indicators may be displayed for pose samples that are separated by no less than a certain number of meters (e.g., ten), and only some of the pose indicators displayed on the user interface are moveable in response to an operator command. Accordingly, in an embodiment, the pose correction engine 950 receives only the sub-sampled portion of the pose data via the front-end interface 952.

According to another embodiment, the pose correction engine 950 generates a version of the pose data provided to the front-end interface 952 by sub-sampling the same original pose data according to the same sampling scheme. For example, to apply trajectory corrections to the rest of the pose data, the sub-sampling module 980 may be coupled to a database that stores complete pose data, such as the image and pose database 12 illustrated in FIG. 1. The pose correction engine 950 accordingly may receive the complete pose data from the image and pose database 12 via the sub-sampling module 980. In an embodiment, the sub-sampling module 980 utilizes the front-end interface 952 to communicate with image and pose database 12 and/or other network devices.

With continued reference to FIG. 16, the optimizer module 960 may implement a non-linear least-squares optimization scheme, for example, using one, several, or all of the terms generated by the components 962, 964, 966, 968, and 970. In an embodiment, the GPS term optimizer 962 generates a location term according to Eq. 3, the user modification term generator 964 generates a user modification term according to Eq. 4, the relative translation term generator 966 generates a relative translation according to Eq. 6, the relative rotation term generator 968 generates a relative rotation term according to Eq. 8, and the gravity direction preservation term 970 generates a gravity preservation term according to Eq. 10, for example. As further illustrated in FIG. 16, each of the components 962, 964, 966, 968, and 970 may be configurable with a respective constraint strength factor $S_{GPS}$, $S_{MOD}$, $S_{TR}$, $S_{ROT}$, or $S_{GR}$. The output of the optimizer module 960 is coupled to the pose data cache 954, from which corrected pose data may be transferred to a database such as the image and pose database 12 of FIG. 1, for example.

Figure 17:
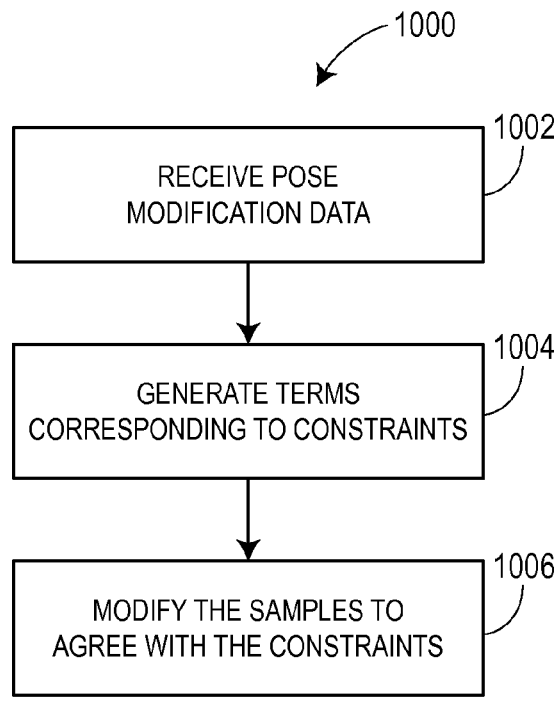
FIG. 17 is a flow diagram of an example method for correcting pose data in view of one or several user modifications.

FIG. 17 is a flow diagram of an example method 1000 for correcting pose data in view of one or several user modifications. The method 100 may be implemented in the pose correction engine 950 of FIG. 16, for example. At block 1002, pose modification data is received from an interactive user interface via a front-end server, for example. The pose modification data corresponds to one or more pose samples of a certain pose run and may indicate, for each of these pose samples, a correction of the reported location of the vehicle by an operator. For example, the correction of the reported location may correction to a new position of the corresponding pose indicator in the interactive visualization of the corresponding pose run. Further, in some embodiments, the operator may be allowed to also correct the orientation of the vehicle.

At block 1004, several terms corresponding to the respective optimization constraints are generated. For example, in an embodiment, a location term that constrains trajectory corrections in view of the originally reported locations, and a user modification term that constrains trajectory corrections in view of the pose modification data received at block 1002, are generated. As discussed above, additional terms that limit stretching and twisting of the approximate trajectory based on the original pose data, for example, also can be used.

Next, at block 1006, pose data that includes one or more samples not modified by the operator, is adjusted to generate a corrected trajectory of the vehicle using the terms generated at block 1004. In some cases, a pose sample modified by an operator is further modified in view of these terms. However, because the user modification term corresponds to a strong constraint, user modifications have a significant impact on the corrected vehicle trajectory. Further, in some cases, a single modification of a pose sample by an operator will affect the location and orientation data in multiple pose samples associated with the same pose run.

Once the pose data is modified at block 1006, the changes may be provided to the operator for confirmation and/or additional modifications. Further, in an embodiment, the pose data modified at block 1006 is stored in the image and pose database 12.

Figure 18:
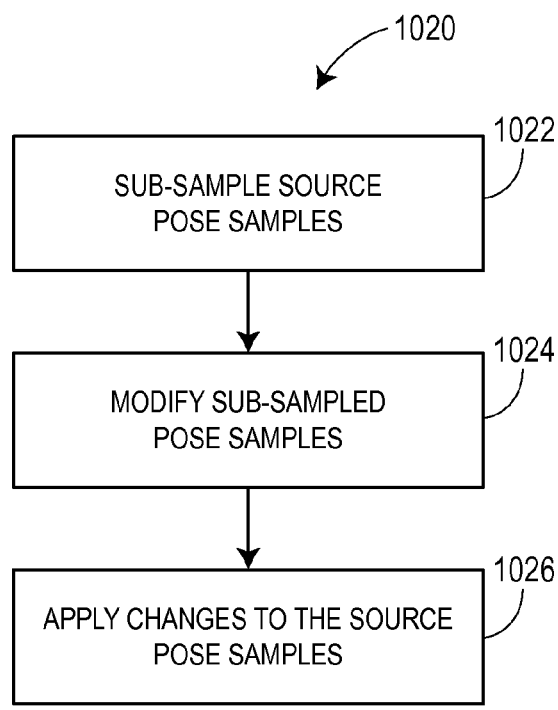
FIG. 18 is a flow diagram of an example method for correcting pose samples using a sub-sample set of the pose samples.

In at least some of the embodiments, pose data that includes pose samples modified at blocks 1002 and 1006 is a sub-sampled version of the original pose data collected during a pose run. Referring to FIG. 18, an example method 1020 for correcting pose samples using a sub-sample set of the pose samples may be implemented in the pose correction engine 950 or one or more other components of the corresponding vehicle trajectory correction system.

At block 1022, source pose data associated with a pose run is sub-sampled so as to generate a set of pose samples reduced by a factor of 1,000, for example. In an embodiment, pose data is sub-sampled so that for each pose same in the reduced set of pose samples, an image is available in the image and pose database 12 or a similar database. Thus, each pose sample that an operator may potentially modify has an associated image for an operator to verify, if desired, prior to adjusting the position of the corresponding pose indicator.

The reduced set of pose samples may be cached at the pose correction engine 950 and provided to a front-end server at the same time. The front-end server in turn may provide some or all of the pose samples in the reduced set to an interactive user interface for user modifications. According to an embodiment, the front-end server further sub-samples the reduced set prior to providing the pose samples to the operator.

At block 1024, the reduced set of pose samples is modified in accordance with the method 1000, for example. Next, at block 1026, the changes to the reduced set of samples are applied to the source pose data (i.e., the high-resolution pose data). To this end, a suitable optimization technique may be used. For example, according to one such technique, the intermediate pose samples included between two pose samples in the reduced set are modified by equally distributing the necessary changes among the intermediate pose samples so as to agree with the modifications at the endpoints. More specifically, if the y-component of the location indicated in one of the pose samples $x_1$ in the reduced set of pose samples changes by an amount d relative to an adjacent pose sample $x_2$ in the reduced set, the amount d may be distributed among n pose samples in the source pose data that are included between the pose samples $x_1$ and $x_2$, and y-component of the location in each of the n pose samples may be adjusted by d/n.

In other embodiments, other algorithms or variations of the algorithm discussed above may be used at block 1026, including those that take into consideration additional factors (such as the speed of the vehicle at the locations corresponding to the pose samples $x_1$ and $x_2$). For example, in an embodiment, the rotational residual is distributed first across the pose samples included the high-resolution pose data, followed by the distribution of location residuals. Further, one or more residuals may be distributed in proportion to the speed of the vehicle, so that pose samples corresponding to instances of time at which the vehicle moves faster are modified more than pose samples corresponding to instances of time at which the vehicle moves slower.

Several examples herein discussed correcting a trajectory of a vehicle. However, it will be understood that the trajectory-correction techniques of the present disclosure are not limited to use only with trajectory data representing movement of one or more vehicles. More generally, the location of a device can be tracked, with its trajectory subsequently corrected, regardless of how the device is moved about.

Additional Considerations

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of ordinary skill in the art will appreciate still additional alternative structural and functional designs for a system and a process for correcting pose image data through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method implemented in one or more computing devices for correcting pose data stored on a computer-readable medium, wherein the pose data includes a plurality of pose samples, wherein each pose sample indicates at least a reported location of a device at a respective time, and wherein the plurality of pose samples describes a trajectory of the device, the method comprising:
receiving pose modification data for a first set of one or more of the plurality of pose samples, wherein the pose modification data includes a respective modification by a user of the location of the device for each pose sample in the first set of pose samples; and
automatically modifying each pose sample in a second set of one or more of the plurality of pose samples in view of the received pose modification data, wherein the second set of pose samples includes at least one pose sample not included in the first set of pose samples, including:
applying one or more user modification constraints, wherein each of the one or more user modification constraints seeks to preserve the modification of the location of the device for a respective pose sample in the first set of pose samples,
applying one or more location constraints, wherein each of the one or more location constraints seeks to preserve the reported location of the device for a respective pose sample in the second set, and
generating modified pose data in view of the one or more user modification constraints and the one or more location constraints.

2. The method of claim 1, wherein:
applying the one or more user modification constraints includes generating, for each pose sample in the first set of pose samples, a respective user modification term for use with an optimization function;
applying the one or more location constraints includes generating, for each pose sample in the second set of pose samples, a respective location term for use with the optimization function; and
generating the modified pose data includes applying the optimization function.

3. The method of claim 1, further comprising:
assigning a first strength to each of the one or more user modification constraints;
assigning a second strength to each of the plurality of location constraints, wherein the first strength is higher than the second strength.

4. The method of claim 1, wherein the device is coupled to a vehicle, and wherein the reported location of the device is generated using Global Positioning Service (GPS) coordinates and wheel odometry data of the vehicle obtained at the respective times.

5. The method of claim 1, wherein each pose sample further indicates reported orientation of the device at the respective time.

6. The method of claim 1, wherein receiving the pose modification data for the first set includes:
causing a respective pose indicator to be displayed over a representation of a geographic area on a user interface for each pose sample in the first set of pose samples in accordance with the respective reported location; and receiving an indication of a modified location for each pose sample in the first set of pose samples from the user interface.

7. The method of claim 1, wherein the plurality of pose samples is a sub-sampled plurality of pose samples, the method further comprising:

receiving a source plurality of pose samples, wherein the source plurality of pose samples describes the trajectory of the device; and sub-sampling, based on at least one of time and distance, the source plurality of pose samples to generate the sub-sampled plurality of pose samples.

8. The method of claim 1, wherein the second set of pose samples includes each pose sample included in the first set of pose samples.

9. The method of claim 2, wherein applying the optimization function includes using a local search optimization scheme.

10. The method of claim 2, wherein applying the optimization function includes strictly enforcing the one or more user modification constraints.

11. The method of claim 10, wherein applying the optimization function further includes attempting to satisfy the one or more location constraints to a maximum degree in view of the strictly enforced one or more user modification constraints.

12. The method of claim 5, further comprising:

applying a plurality of relative translation constraints, wherein each of plurality of relative translation constraints seeks to preserve a relative position and orientation between a pair of adjacent poses, each corresponding to a respective one of the plurality of pose samples;

wherein the modified pose data is generated further in view of the plurality of relative translation constraints.

13. The method of claim 5, further comprising:

applying a plurality of relative rotation constraints, wherein each of the plurality of relative rotation constraint seeks to preserve a relative orientation between a pair of adjacent poses, each corresponding to a respective one of the plurality of pose samples, and wherein the modified pose data is generated further in view of the plurality of relative rotation constraints.

14. The method of claim 5, further comprising:

applying a plurality of gravity direction preservation constraints, wherein each of the plurality of gravity direction preservation constraints seeks to preserve a direction of gravity for a respective one of the plurality of pose samples;

wherein the modified pose data is generated further in view of the plurality of gravity direction preservation constraints.

15. The method of claim 5, wherein the device is coupled to a vehicle, and wherein the reported orientation of the device for each of plurality of pose sample is generated using an Inertial Measurement Unit (IMU) data of the vehicle obtained at the respective times.

16. The method of claim 6, wherein the device includes a camera mounted on a vehicle, and wherein receiving the pose modification data includes causing an image for each pose sample in the first set of pose samples to be displayed on a user interface, wherein the image is obtained using the camera.

17. The method of claim 7, further comprising:

automatically modifying the source plurality of pose samples in view of the modified pose data.

18. A pose correction engine for modifying a trajectory of a device, the pose correction engine comprising:

an interface module configured to receive (i) pose data that includes a plurality of pose samples, wherein each pose sample indicates at least a reported location of a device at a respective time, and wherein the plurality of pose samples describes the trajectory of the device, and (ii) pose modification data for a first set of one or more of the plurality of pose samples, wherein the received pose modification data indicates a respective modification by a user of each pose sample in the first set of pose samples;

a user modification term generator configured to generate a respective user modification term for each pose sample in the first set of pose samples, wherein each user modification term represents a respective user modification constraint that seeks to preserve the modification by the user for the corresponding pose sample;

a location term generator configured to generate a respective location term for each pose sample in a second set of one or more of the plurality of pose samples, wherein the second set of pose samples includes one or more pose samples not included in the first set of pose samples, wherein each location term represents a respective location constraint that seeks to preserve the reported location of the device for the corresponding pose sample; and a pose optimizer module communicatively coupled to the user modification term generator and the location term generator, wherein the pose optimizer module is configured to modify at least some of the plurality of pose samples using the one or more user modification terms and the one or more location terms to generate modified pose data;

whereby the modified pose data optimally agrees with the pose modification data and the received pose data in view of the one or more user modification constraints and the one or more location constraints.

19. The pose correction engine of claim 18, further comprising:

a cache memory module configured to store the plurality of pose samples, wherein the user modifies each pose sample included in the first set of pose samples at a remote computing device using the plurality of pose samples.

20. The pose correction engine of claim 18, wherein:

the pose optimizer module is configured to (i) apply the one or more user modification terms in accordance with a first strength and (ii) apply the one or more location terms in accordance with a second strength; and the first strength is higher than the second strength.

21. The pose correction engine of claim 18, wherein each of the plurality of pose samples further indicates reported orientation of the device at the respective time.

22. The pose correction engine of claim 21, further comprising:

a relative translation term generator configured to generate a respective relative translation term for each pair of adjacent ones of the plurality of pose samples, wherein each relative translation term represents a respective relative translation constraint that seeks to preserve a relative position and orientation between the corresponding pair of adjacent poses;

a relative rotation term generator configured to generate a respective relative rotation term for each pair of adjacent ones of the plurality of pose samples, wherein each relative rotation term represents a respective relative rotation constraint that seeks to preserve a relative orientation between the corresponding pair of adjacent poses;
a gravity direction preservation term generator configured to generate a respective gravity direction preservation term for each of the plurality of pose samples, wherein each gravity direction preservation term represents a respective gravity direction preservation constraint that seeks to preserve a direction of gravity for the corresponding pose sample;
wherein the pose optimizer module is configured to modify each pose sample in the second set further using the relative translation terms, the relative rotation terms, and the gravity direction preservation terms;
whereby the modified pose data optimally agrees with the pose modification data and the received pose data further in view of the relative translation constraints, the relative rotation constraints, and the gravity direction preservation constraints.

23. The pose correction engine of claim 22, wherein:
the pose optimizer module is configured to implement a local search optimization scheme and (i) apply the user modification terms in accordance with a first strength, (ii) apply the location terms in accordance with a second strength, (iii) apply the relative translation terms in accordance with a third strength, (iv) apply the relative rotation terms in accordance with a fourth strength, and (v) apply the gravity direction preservation terms in accordance with a fifth strength;
each of the first strength, the third strength, the fourth strength, and the fifth strength is higher than the second strength.

24. A trajectory correction system, comprising:
a database configured to store pose data that includes a plurality of pose samples, wherein each pose sample indicates at least a reported location of a device at a respective time, and wherein the plurality of pose samples describes a trajectory of the device in a three-dimensional space;
a pose rendering engine communicatively coupled to the database and configured to:
provide an interactive user interface via which a user can modify one or more pose samples, and
receive pose modification data from the interactive user interface for a first set of one or more of the plurality of pose samples; wherein the received pose modification data indicates a respective modification of each pose sample included in the first set;
the trajectory correction system further comprising:
a pose correction engine communicatively coupled to the database and to the pose rendering engine, wherein the pose correction engine is configured to:
receive the pose modification data, and
automatically modify each pose sample in a second set of one or more of the plurality of pose samples in view of the received pose modification data to generate modified pose data, wherein the second set includes at least one pose sample not included in the first set.

25. The trajectory correction system of claim 24, wherein:
the pose rendering engine and the pose correction engine operate respectively in a front-end server and a back-end server, and
the front-end server and the back-end server are coupled via a communication network.

26. The trajectory correction system of claim 24, wherein each pose sample further indicates a reported orientation of the device in the three-dimensional space at the respective time.

27. The trajectory correction system of claim 24, wherein the pose rendering engine is configured to:
cause a representation of a geographic area to be displayed on a display device;
cause a respective pose indicator to be displayed over the representation of the geographic area for at least some of the plurality of pose samples, wherein the pose indicator is positioned over the representation of the geographic area in accordance with the reported location included in the corresponding pose sample; and
for each pose sample in the first set, receive an indication of a modified position of the corresponding pose indicator relative to the representation of the geographic area on the display device.

28. The trajectory correction system of claim 24, wherein the pose correction engine includes:
a plurality of optimizer term generation modules configured to generate a plurality of optimization terms, wherein each optimization term corresponds to a respective optimization constraint; and
an optimizer module configured to modify the pose samples in the second set using the plurality of optimization terms so that the modified pose data optimally agrees with the pose modification data subject to the optimization constraints.

29. The trajectory correction system of claim 24, wherein each of the plurality of pose records further includes an image obtained at the geographic location which the corresponding pose sample indicates.

30. The trajectory correction system of claim 25, further comprising a pose correction user interface module that operates in a client device, wherein:
the client device is coupled to the front-end server via the communication network, and
the front-end server provides the interactive user interface on the client device.

31. The trajectory correction system of claim 25, wherein:
the back-end server includes a first memory module to store the plurality of pose samples; and
wherein the user modifies each pose sample included in the first set using the plurality of pose samples stored in a second memory module.

32. The trajectory correction system of claim 28, wherein the plurality of optimizer term generation modules includes:
a user modification term generator configured to generate a respective user modification term for each pose sample in the first set of pose samples, wherein each user modification term represents a respective user modification constraint that seeks to preserve the modification by the user for the corresponding pose sample; and
a location term generator configured to generate a respective location term for each pose sample in the second set of pose samples, wherein each location term represents a respective location constraint that seeks to preserve the reported location of the device for the corresponding pose sample;
wherein the user modification constraints are stronger than the location constraints.

* * * * *